(12) United States Patent
Yokota

(10) Patent No.: US 9,078,182 B2
(45) Date of Patent: *Jul. 7, 2015

(54) RADIO TERMINAL AND COMMUNICATION TERMINAL

(75) Inventor: Tomoyoshi Yokota, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 476 days.

This patent is subject to a terminal disclaimer.

(21) Appl. No.: 13/061,089

(22) PCT Filed: Aug. 27, 2009

(86) PCT No.: PCT/JP2009/064998
§ 371 (c)(1),
(2), (4) Date: May 13, 2011

(87) PCT Pub. No.: WO2010/024351
PCT Pub. Date: Mar. 4, 2010

(65) Prior Publication Data
US 2011/0205922 A1    Aug. 25, 2011

(30) Foreign Application Priority Data

Aug. 28, 2008  (JP) ................................ 2008-219842
Jan. 28, 2009  (JP) ................................ 2009-017403

(51) Int. Cl.
*H04W 36/02* (2009.01)
*H04W 36/14* (2009.01)

(52) U.S. Cl.
CPC .............. *H04W 36/02* (2013.01); *H04W 36/14* (2013.01)

(58) Field of Classification Search
USPC .................................................. 370/331, 338
See application file for complete search history.

(56) References Cited

U.S. PATENT DOCUMENTS

2004/0267956 A1   12/2004  Leon et al.
2005/0259663 A1*  11/2005  Ode et al. ................... 370/395.4
2005/0265287 A1*  12/2005  Lee et al. ...................... 370/331
2006/0077994 A1    4/2006  Spindola et al.
(Continued)

FOREIGN PATENT DOCUMENTS

JP   2006-524452 A   1/2006
JP   2008-014266 A   1/2008
(Continued)

OTHER PUBLICATIONS

Notification of Reasons for Refusal dated Apr. 17, 2012, issue for counterpart Japanese Application No. 2010-526766.
(Continued)

*Primary Examiner* — Brandon Renner
(74) *Attorney, Agent, or Firm* — Procopio, Cory, Hargreaves & Savitch LLP

(57) ABSTRACT

A radio terminal (10) comprises a radio communication unit (11) that receives packets via a first or second network at predetermined intervals; a buffer (15) that temporarily stores packets received by a receiving unit; a radio communication unit (11) that transmits a preparation request for a handover from the first network to the second network; and an application processing unit (16) that reproduces the packets stored in the buffer (15) at a rate that is established in accordance with the predetermined intervals. The application processing unit (16) changes a packet reproduction rate to a rate slower than the predetermined rate in response to transmission of the preparation request for handover, thereby increases the amount of packets stored in the buffer.

16 Claims, 11 Drawing Sheets

(56) References Cited

U.S. PATENT DOCUMENTS

| | | | |
|---|---|---|---|
| 2006/0178167 A1* | 8/2006 | Tamura et al. | 455/560 |
| 2006/0240828 A1* | 10/2006 | Jain et al. | 455/436 |
| 2007/0076662 A1* | 4/2007 | Jain et al. | 370/331 |
| 2008/0268848 A1* | 10/2008 | Tomoe et al. | 455/436 |
| 2009/0291689 A1* | 11/2009 | Negishi et al. | 455/436 |
| 2011/0158201 A1 | 6/2011 | Yokota | |

FOREIGN PATENT DOCUMENTS

| | | |
|---|---|---|
| JP | 2008-516562 A | 5/2008 |
| WO | 2009/119764 A1 | 10/2009 |
| WO | 2010/024350 A1 | 3/2010 |

OTHER PUBLICATIONS

International Search Report and Written Opinion dated Dec. 1, 2009 issued by the Japanese Patent Office for International Application No. PCT/JP2009/064998.

* cited by examiner

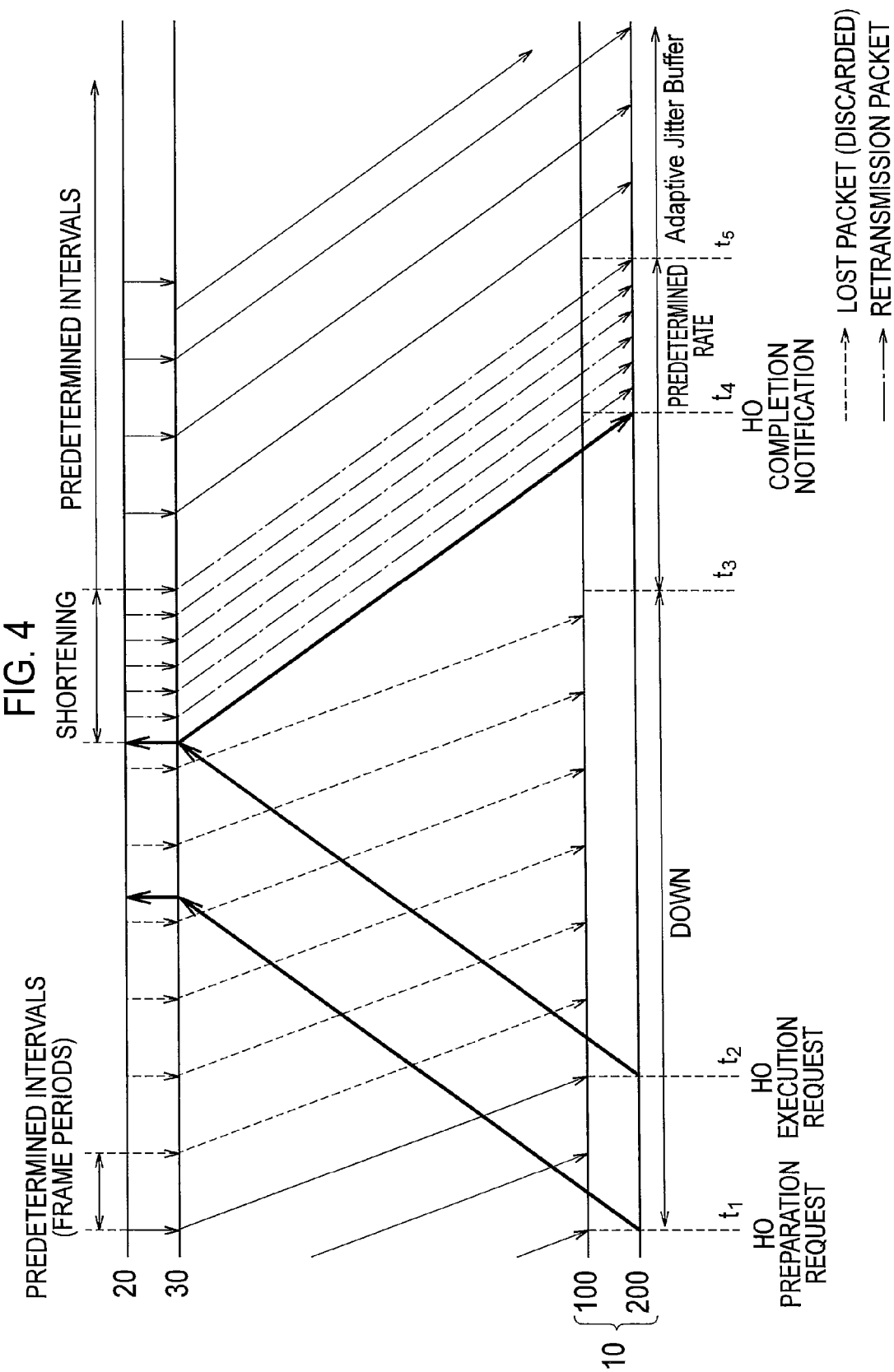

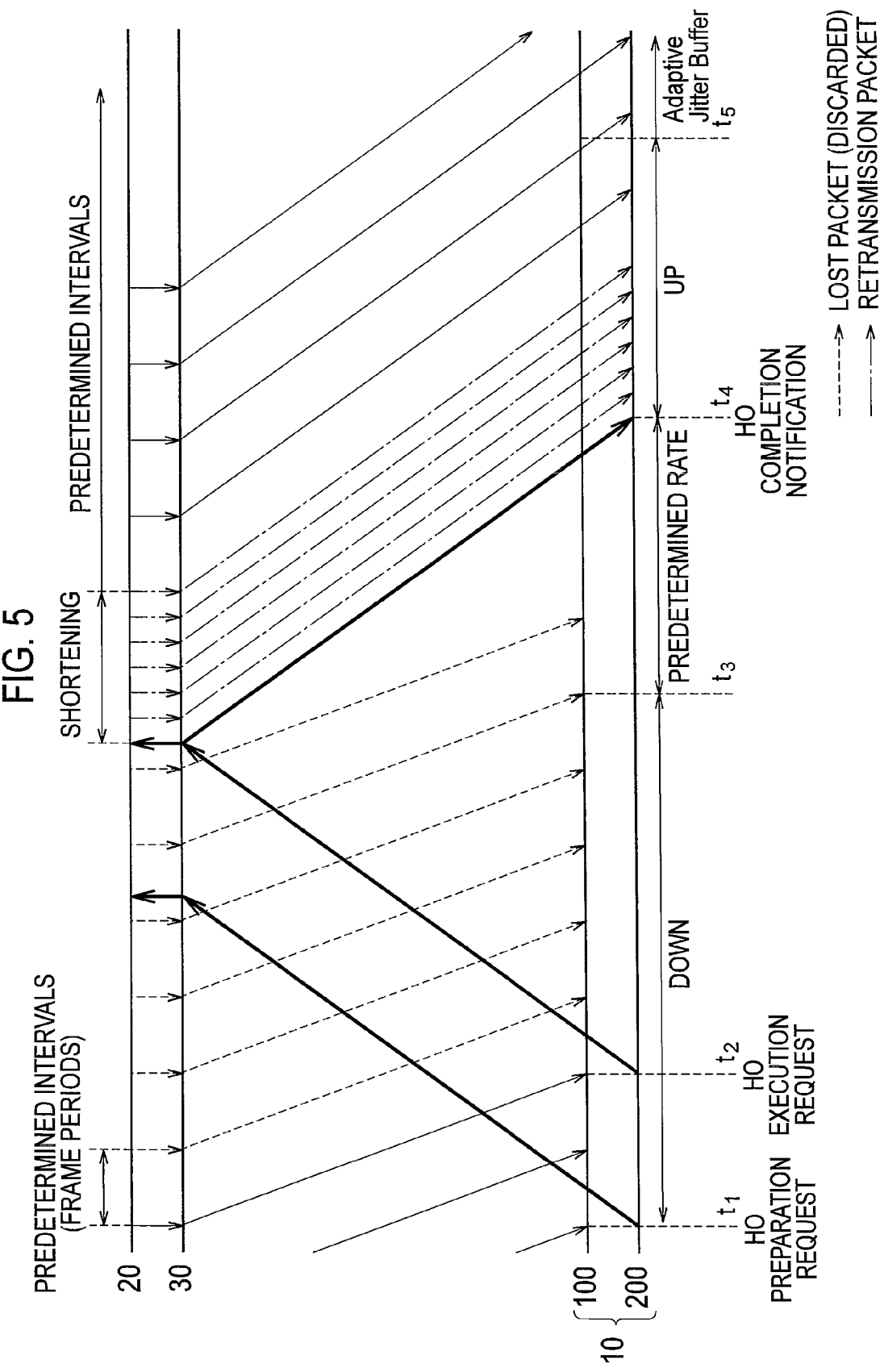

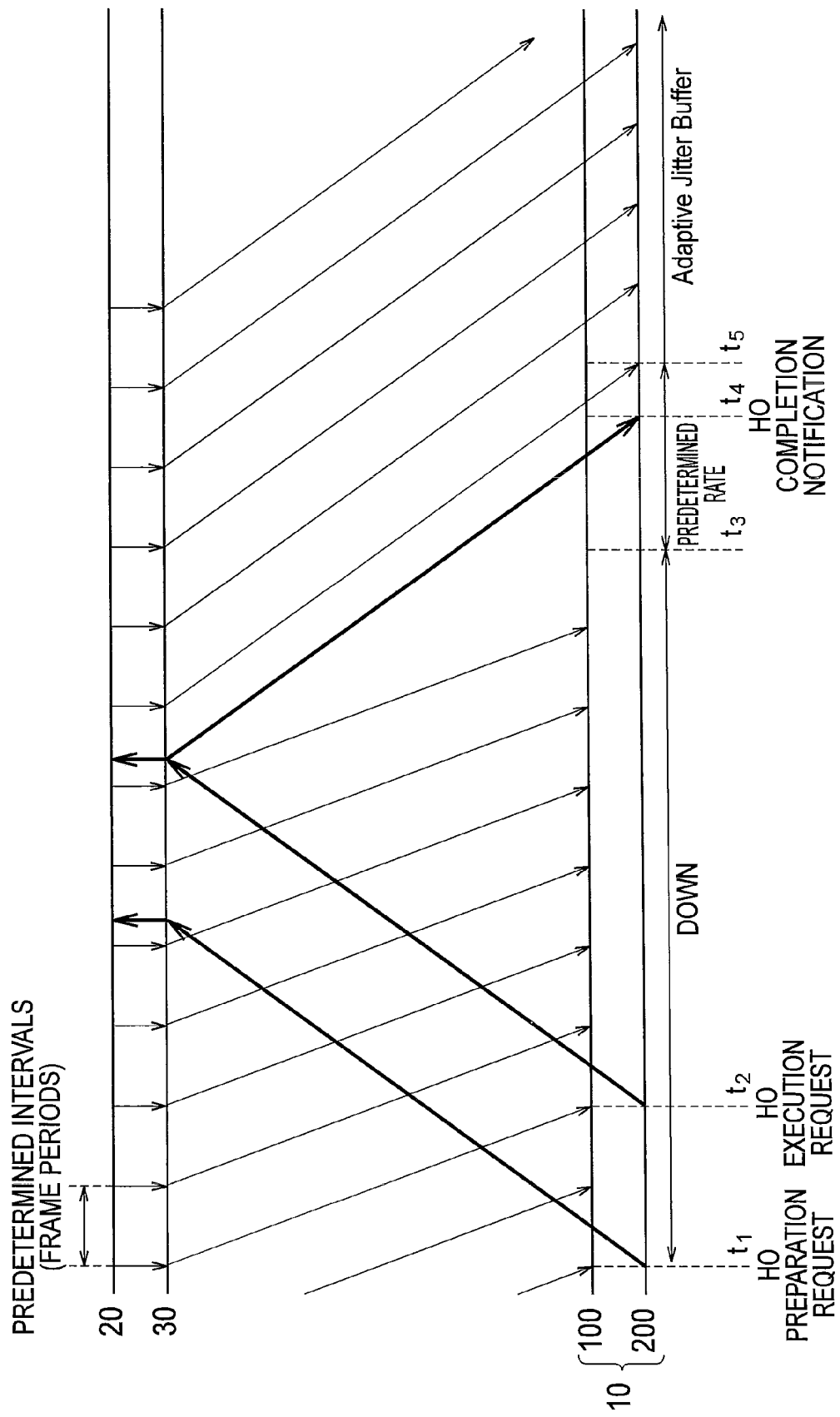

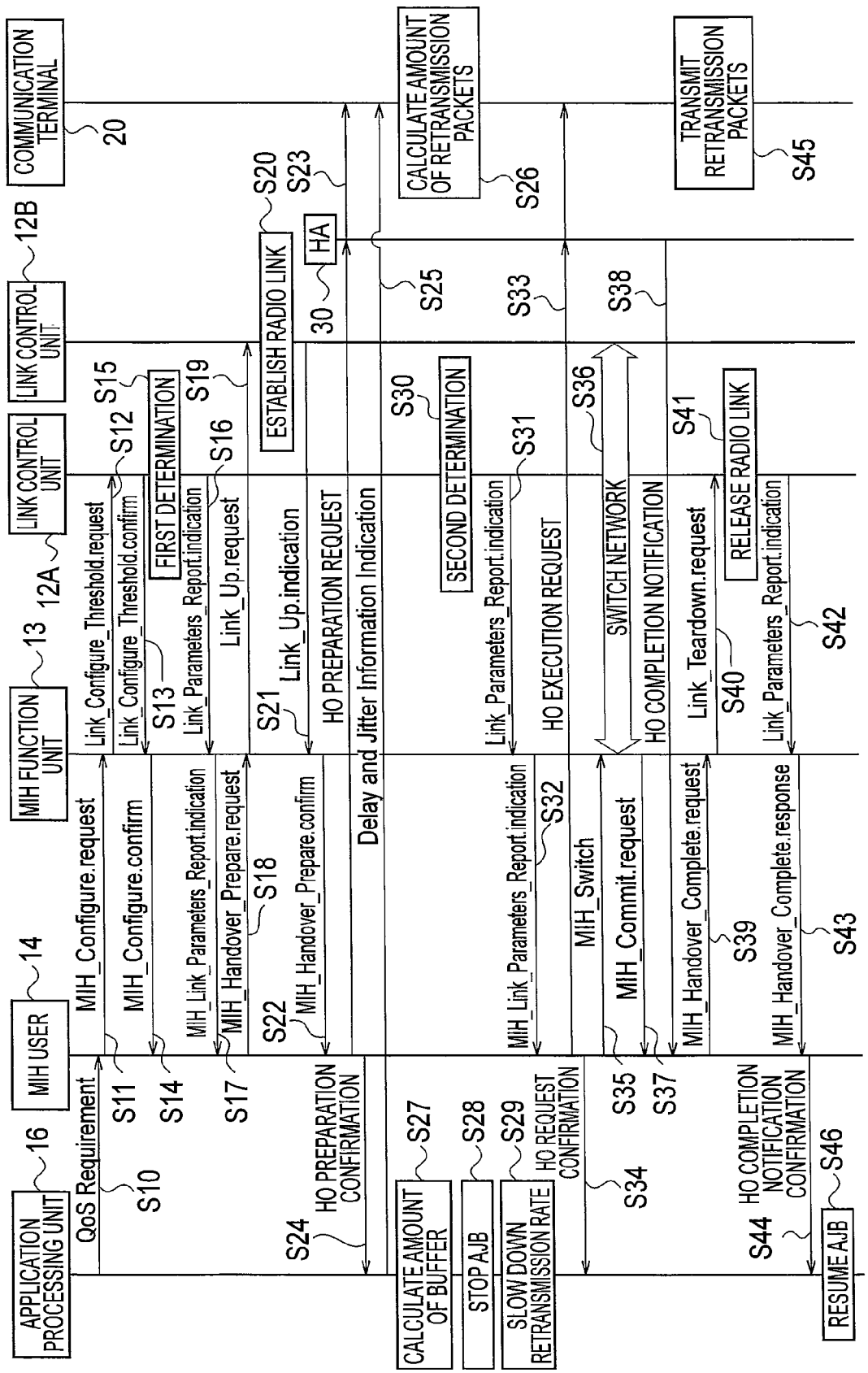

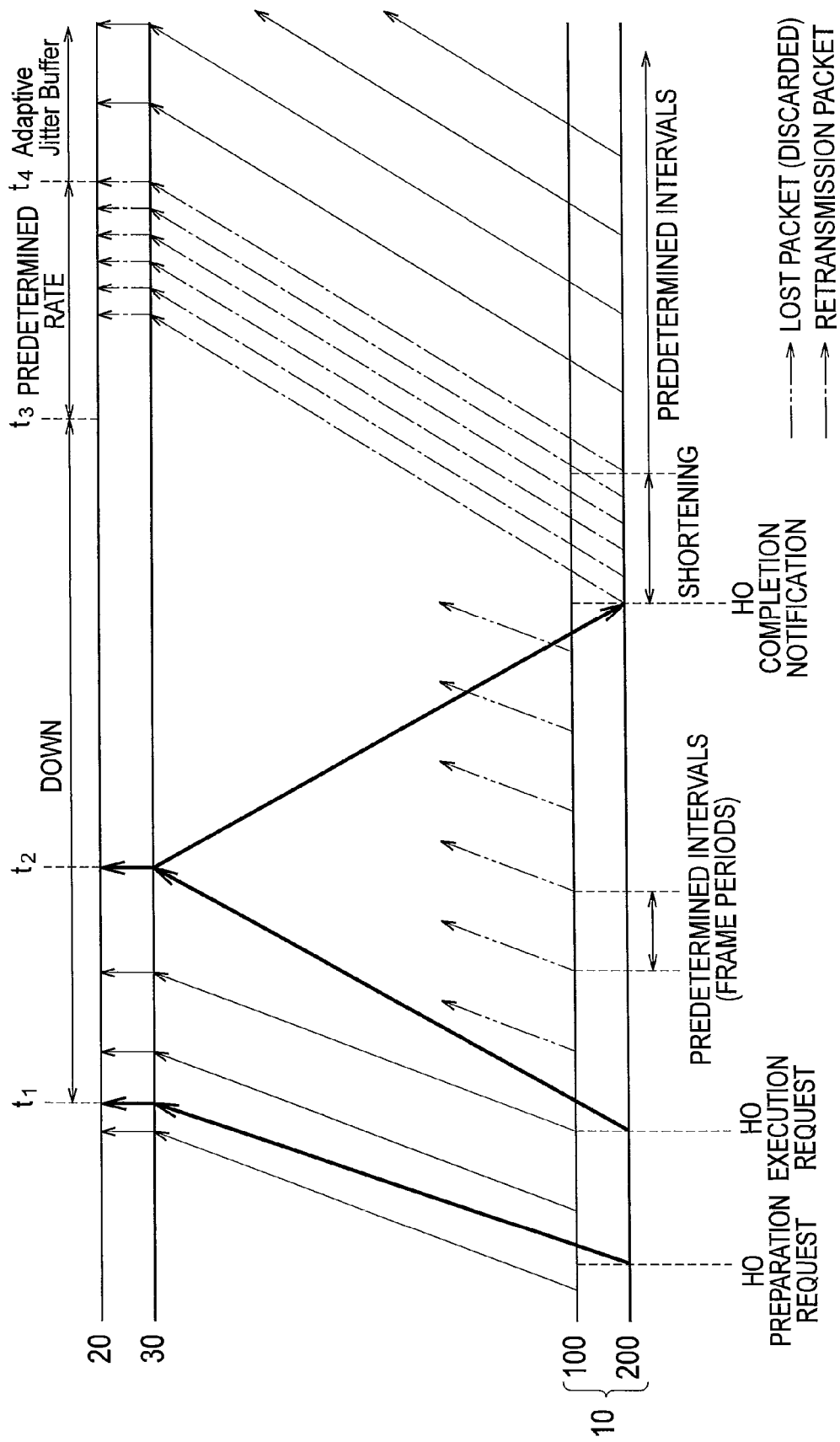

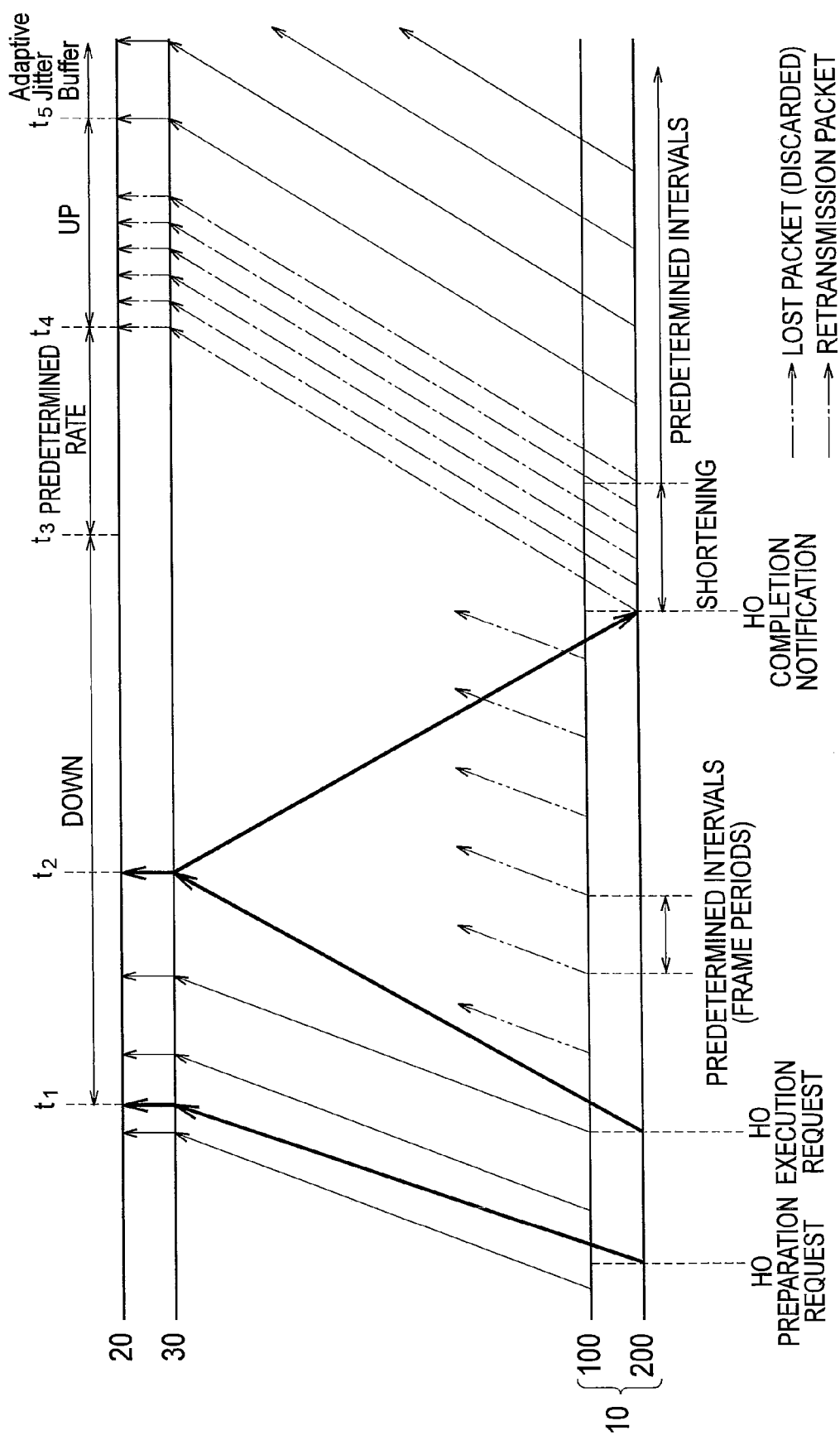

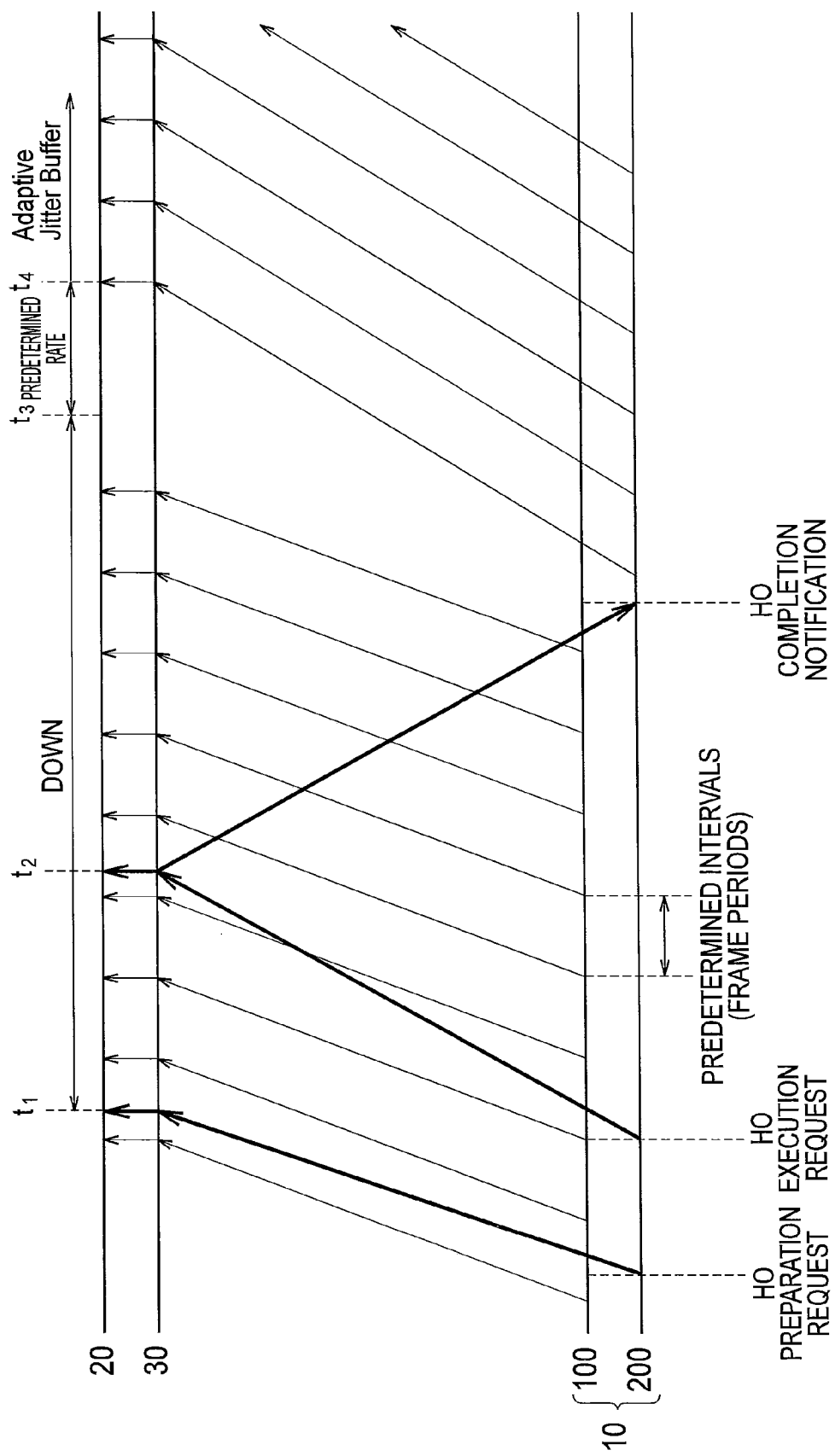

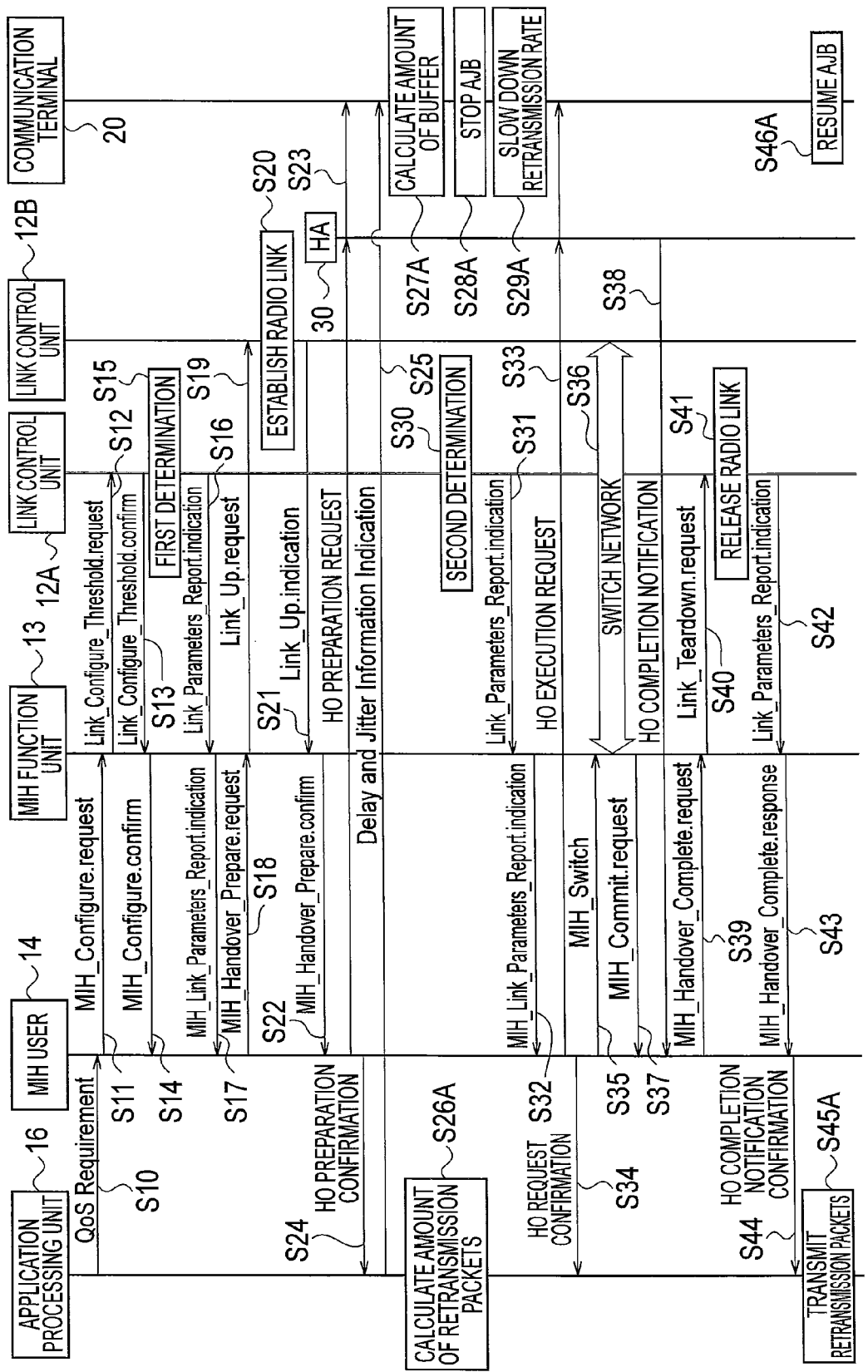

RADIO TERMINAL AND COMMUNICATION TERMINAL

TECHNICAL FIELD

The present invention relates to a radio terminal and a communication terminal which communicate through a first network or a second network having a longer delay time than the first network.

BACKGROUND ART

Conventionally, a radio terminal which performs real-time communication (such as VoIP) with a communication terminal (correspondent terminal) through a network is known (see Patent Document 1, for example). The radio terminal is provided with a buffer for temporarily storing packets to absorb a delay time of the network. The amount of packets stored in the buffer is determined according to the delay time of the network. Note that a delay time of a network is a concept which includes not only a time that a packet from the communication terminal (correspondent terminal) held in the network (holding time) but also variation (jitter) in the holding time.

In addition, an AJB (adaptive jitter buffer) control technique targeted for a single network is proposed in which a stored packet amount (jitter buffer size) is changed by controlling a reproduction rate according to a delay time of received packets (holding time and variation in the holding time). In the AJB control technique, the stored packet amount is reduced by changing the packet reproduction rate to a rate higher (faster) than a predetermined rate when the amount of packets stored in the buffer becomes larger than an optimal packet amount. On the other hand, the stored packet amount is increased by changing the packet reproduction rate to a rate lower (slower) than the predetermined rate when the amount of packets stored in the buffer becomes smaller than the optimal packet amount.

PRIOR ART DOCUMENT

Patent Document

Patent Document 1: Japanese Patent Application Publication No. 2008-14266

SUMMARY OF THE INVENTION

Meanwhile, a technique for performing handover from a first network to a second network is known. Moreover, there may be a case where a delay time of the second network differs from a delay time of the first network. In this case, the optimal amount of packets stored in a buffer changes after execution of handover.

For example, assume a case where the delay time of the first network is shorter than the delay time of the second network. In this case, the appropriate packet amount in the second network is larger than the appropriate packet amount in the first network. Accordingly, the buffer stores an insufficient amount of packets after handover from the first network to the second network. This may cause a packet loss.

Note that as has been described, the AJB control technique is targeted for a single network. Consequently, in the case of applying the AJB control technique, the radio terminal attempts to abruptly increase the amount of packets stored in the buffer in response to handover from the first network to the second network. In other words, the radio terminal abruptly lowers the packet reproduction rate.

Thus, it is difficult to appropriately control the amount of packets stored in the buffer after handover from the first network to the second network.

The present invention has been made to solve the above problem, and has an object to provide a radio terminal and a communication terminal which enable appropriate control of the amount of packets stored in a buffer after handover from a first network to a second network.

A first aspect of a radio terminal which communicates with a communication terminal through any of a first network and a second network having a longer delay time than the first network. The radio terminal includes: a reception unit configured to receive packets at predetermined intervals through any of the first network and the second network; a buffer configured to temporarily store therein packets received in the reception unit; a transmission unit configured to transmit a preparation request for handover from the first network to the second network; and a reproduction unit configured to reproduce the packets stored in the buffer at a predetermined rate determined according to the predetermined intervals. The reproduction unit increases the amount of packets stored in the buffer by changing a packet reproduction rate to a rate slower than the predetermined rate, in response to transmission of the preparation request for handover.

According to the first aspect, the radio terminal changes the packet reproduction rate to a rate slower than the predetermined rate in response to transmission of a handover preparation request. Accordingly, it is possible to promptly bring the amount of packets stored in the buffer close to the optimal packet amount (second optimal packet amount) in the second network, after handover from the first network to the second network. It is also possible to suppress packet losses.

In the first aspect, the reproduction unit performs adaptive buffer control of adjusting a reproduction rate of the packets so as to maintain the amount of packets stored in the buffer at an optimal packet amount. The reproduction unit stops the adaptive buffer control in response to transmission of the preparation request for handover.

In the first aspect, the reception unit receives a completion notification of handover from the first network to the second network. The reproduction unit resumes the adaptive buffer control in a case where the amount of packets stored in the buffer reaches an optimal packet amount in the second network after receipt of the completion notification of handover.

In the first aspect, the reception unit receives a completion notification of handover from the first network to the second network. The reproduction unit changes the packet reproduction rate back to the predetermined rate, in a case where the amount of packets stored in the buffer reaches a predetermined packet amount before receipt of the completion notification for handover.

In the first aspect, the reception unit receives a completion notification for handover from the first network to the second network. The reproduction unit changes the packet reproduction rate back to the predetermined rate, in a case where the amount of packets stored in the buffer reaches a predetermined packet amount before receipt of the completion notification for handover. The reproduction unit changes the packet reproduction rate to a rate faster than the predetermined rate in response to receipt of the completion notification for handover.

In the first aspect, the predetermined packet amount is calculated on the basis of the delay time of the first network and the delay time of the second network.

A second aspect of a communication terminal which communicates with a radio terminal using any of a first network and a second network having a longer delay time than the first network. The communication terminal includes: a transmission unit configured to transmit packets at predetermined intervals to the radio terminal, a reception unit configured to receive a preparation request for handover from the first network to the second network, and an execution request for handover of the radio terminal from the first network to the second network after the receipt of the preparation request for handover, and an acquisition unit configured to acquire the delay time of the first network and the delay time of the second network in response to the receipt of the preparation request for handover. The transmission unit transmits retransmission packets at intervals shorter than the predetermined intervals after the receipt of the execution request for handover, the retransmission packets being packets that the radio terminal unable to receive normally.

In the second aspect, the transmission unit transmits the retransmission packets with a lower coding rate than the packets transmitted at the predetermined intervals.

A third aspect of a communication terminal which communicates with a radio terminal using any of a first network and a second network having a longer delay time than the first network. The communication terminal includes: a reception unit configured to receive packets at predetermined intervals from the radio terminal; a buffer configured to temporarily store packets received in the reception unit; and a reproduction unit configured to reproduce the packets stored in the buffer at a predetermined rate determined according to the predetermined intervals. The reception unit receives a preparation request for handover of the radio terminal from the first network to the second network. The reproduction unit increases the amount of packets stored in the buffer by changing a packet reproduction rate to a rate slower than the predetermined rate, in response to receipt of the preparation request for handover.

According to the first aspect, the communication terminal changes the packet reproduction rate to a rate slower than the predetermined rate in response to transmission of a handover preparation request. Accordingly, it is possible to promptly bring the amount of packets stored in the buffer close to the optimal packet amount (second optimal packet amount) in the second network, after handover from the first network to the second network. It is also possible to suppress packet losses.

In the third aspect, the reproduction unit performs adaptive buffer control of adjusting a reproduction rate of the packets so as to maintain the amount of packets stored in the buffer at an optimal packet amount. The reproduction unit stops the adaptive buffer control upon receipt of the preparation request for handover.

In the third aspect, the reception unit receives an execution request for handover of the radio terminal from the first network to the second network. The reproduction unit resumes the adaptive buffer control in a case where the amount of packets stored in the buffer reaches an optimal packet amount in the second network after receipt of the execution request for handover.

In the third aspect, the reproduction unit changes the packet reproduction rate back to the predetermined rate, in a case where the amount of packets stored in the buffer reaches a predetermined packet amount before receipt of the first packet of packets to be received through the second network.

In the third aspect, the reproduction unit changes the packet reproduction rate back to the predetermined rate, in a case where the amount of packets stored in the buffer reaches a predetermined packet amount before receipt of the first packet of packets to be received through the second network. The reproduction unit changes the packet reproduction rate to a rate faster than the predetermined rate in response to receipt of the first packet.

In the third aspect, the predetermined packet amount is calculated on the basis of the delay time of the first network and the delay time of the second network.

A fourth aspect of a radio terminal which communicates with a communication terminal using any of a first network and a second network having a longer delay time than the first network. The radio terminal includes: a transmission unit configured to transmit packets at predetermined intervals to the radio terminal via any of the first network and the second network, transmit a preparation request for handover from the first network to the second network, and an execution request for handover of the radio terminal from the first network to the second network after the transmission of the preparation request for handover, and an acquisition unit configured to acquire the delay time of the first network and the delay time of the second network in response to the transmission of the preparation request for handover. The transmission unit transmits retransmission packets at intervals shorter than the predetermined intervals after the receipt of the execution request for handover, the retransmission packets being packets that the communication terminal unable to receive normally.

In the fourth aspect, the transmission unit transmits the retransmission packets with a lower coding rate than the packets transmitted at the predetermined intervals.

According to the present invention, provided are a radio terminal and a communication terminal which enable appropriate control of the amount of packets stored in a buffer after handover from a first network to a second network.

BRIEF DESCRIPTION OF THE DRAWINGS

FIG. 4 is a diagram showing an example of reproduction rate control according to the first embodiment.

FIG. 5 is a diagram showing an example of reproduction rate control according to the first embodiment.

FIG. 6 is a diagram showing an example of reproduction rate control according to the first embodiment.

FIG. 7 is a sequence diagram showing an operation of the communication system according to the first embodiment.

FIG. 8 is a diagram showing an example of reproduction rate control according to a second embodiment.

FIG. 9 is a diagram showing an example of reproduction rate control according to the second embodiment.

FIG. 10 is a diagram showing an example of reproduction rate control according to the second embodiment.

FIG. 11 is a sequence diagram showing an operation of the communication system according to the second embodiment.

EMBODIMENTS FOR CARRYING OUT THE INVENTION

Hereinbelow, embodiments of the present invention will be described. Note that, in the following description of the drawings, same or similar reference signs_denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

[First Embodiment]

(Configuration of Communication System)

Figure 1:
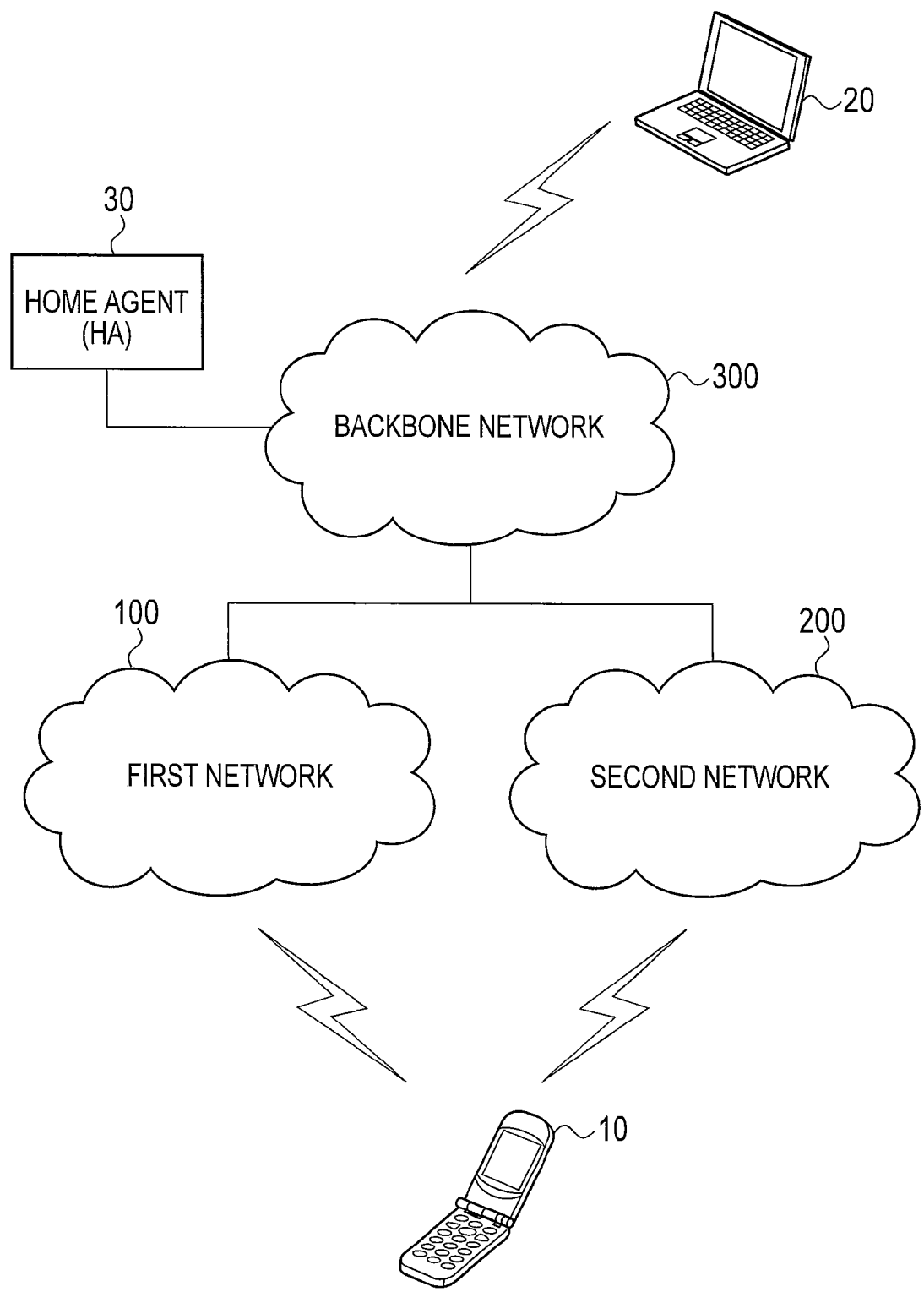
FIG. 1 is a diagram showing a configuration of a communication system according to a first embodiment.

Hereinbelow, a configuration of a communication system according to a first embodiment will be described with reference to the drawings. FIG. 1 is a diagram showing the configuration of the communication system according to the first embodiment.

As shown in FIG. 1, the communication system includes a radio terminal 10, a communication terminal 20, a home agent 30, a first network 100, a second network 200 and a backbone network 300.

In the first embodiment, a delay time of the first network 100 is shorter than a delay time of the second network 200. The radio terminal 10 communicates with the communication terminal 20 through the first network 100 or the second network 200.

Note that a delay time of a network is a concept which includes not only a time that a packet from the communication terminal 20 (correspondent terminal) held in the network (holding time) but also variation (jitter) in the holding time. A holding time is correlated with jitter. Generally, the longer the holding time, the larger the jitter.

In the first embodiment, the description is given mainly of a case where the radio terminal 10 performs handover from the first network 100 to the second network 200. In addition, a flow of packets from the communication terminal 20 to the radio terminal 10 is mainly described.

The radio terminal 10 is a terminal such as a mobile phone, a PDA, a laptop PC or the like. Otherwise, the radio terminal 10 may be a terminal such as a mobile router. As described above, the radio terminal 10 is a terminal (MN: mobile node) which communicates with the communication terminal 20 through the first network 100 or the second network 200. In other words, the radio terminal 10 communicates with the communication terminal 20 by use of the first network 100 or the second network 200. The radio terminal 10 receives packets transmitted from the communication terminal 20 at predetermined intervals (frame periods). Here, the radio terminal 10 is an entity which performs handover from the first network 100 to the second network 200. Details of the radio terminal 10 will be described later (see FIG. 2).

The communication terminal 20 is a terminal such as a mobile phone, a PDA, a laptop PC, a desktop PC or the like. The communication terminal is a communication terminal (CN: corresponding node) which communicates with the radio terminal 10. The communication terminal 20 transmits packets to the radio terminal 10 at predetermined intervals (frame periods).

The communication terminal 20 may either be a terminal connecting to the backbone network 300 by radio communications, or a terminal connecting to the backbone network 300 by wired communications. The first embodiment exemplifies a case where the communication terminal 20 is a radio terminal. Although not shown in FIG. 1, the communication terminal 20 is connected to the backbone network 300 through multiple radio networks. Details of the communication terminal 20 will be described later (see FIG. 3).

The home agent 30 (HA) is connected to the backbone network 300. The home agent 30 manages CoAs (care of addresses) of the radio terminal 10.

The first network 100 and the second network 200 are radio networks employing different radio communication schemes (configuration of the physical layer or the link layer). For example, the first network 100 is a radio network which employs "WiMAX" conforming to IEEE802.16e. The second network 200 is a radio network which employs "1xEV-DO" conforming to CDMA2000.

Note, however, that the first network 100 and the second network 200 are not limited to these networks and may be a network which employs "WLAN" conforming to IEEE802.11.

The backbone network 300 is a higher network than the first network 100 and the second network 200. For example, the backbone network 300 is an Internet network conforming to IP (internet protocol). In the first embodiment, the communication terminal 20 and the home agent 30 are connected to the backbone network 300.

(Configuration of Radio Terminal)

Figure 2:
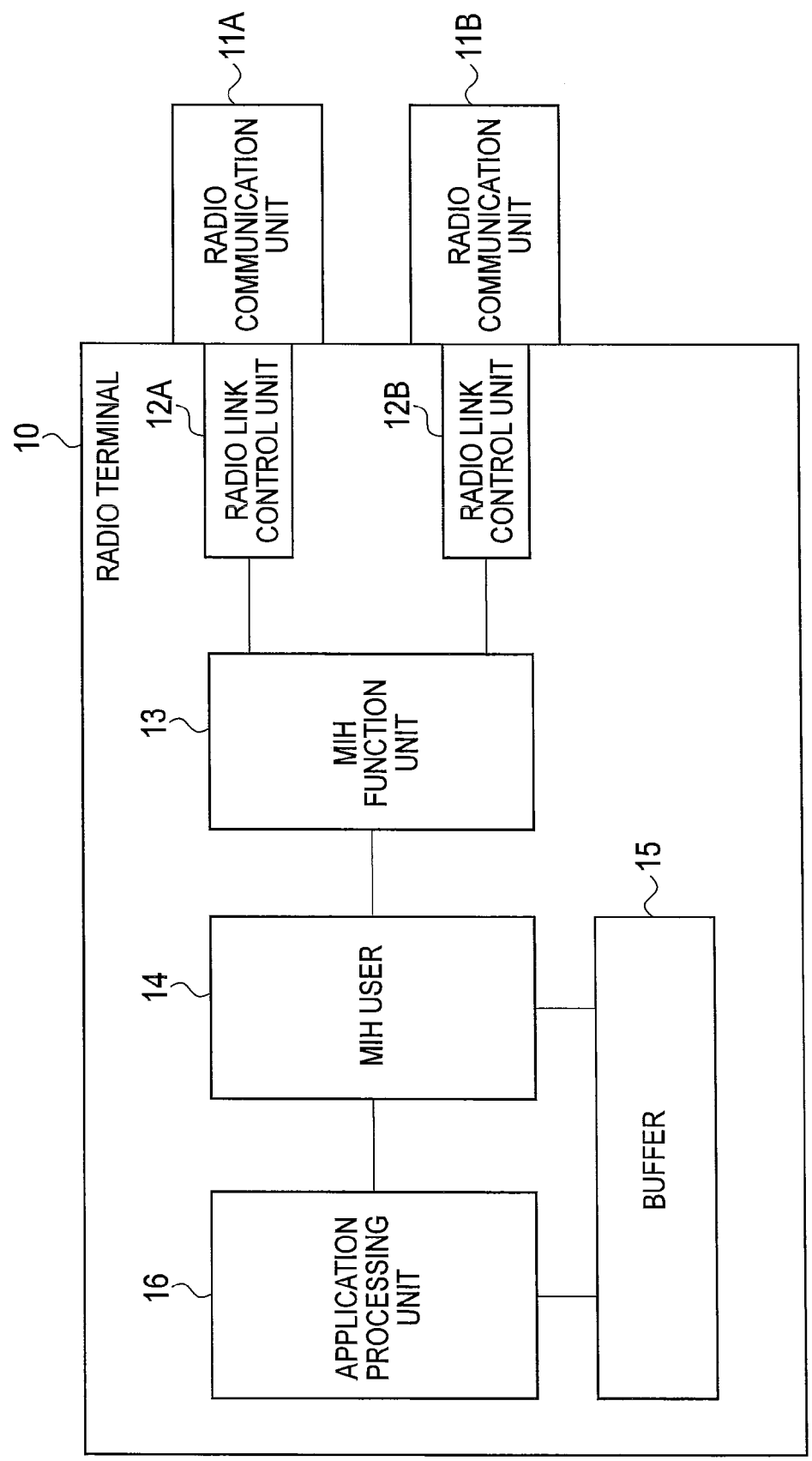
FIG. 2 is a block diagram showing a radio terminal 10 according to the first embodiment.

Hereinafter, a configuration of the radio terminal (MN) according to the first embodiment will be described with reference to the drawings. FIG. 2 is a block diagram showing the radio terminal 10 according to the first embodiment.

As shown in FIG. 2, the radio terminal 10 includes multiple radio communication units 11 (radio communication unit 11A and radio communication unit 11B), multiple radio link control units 12 (radio link control unit 12A and radio link control unit 12B), an MIH function unit 13, an MIH user 14, a buffer 15 and an application processing unit 16.

The radio communication unit 11 establishes a physical radio connection in the physical layer with each network, in response to an instruction from a higher layer (such as the MIH function unit 13 and the application processing unit 16). The radio communication unit 11 receives packets from the communication terminal 20 at predetermined intervals.

To be specific, the radio communication unit 11A establishes a physical radio connection supporting "WiMAX" with the first network 100. The radio communication unit 11B establishes a physical radio connection supporting "1xEV-DO" with the second network 200.

The radio link control unit 12 establishes a radio link in the link layer with each network, in response to an instruction from a higher layer (such as the MIH function unit 13 and the application processing unit 16). The radio link control unit 12 monitors various radio parameters (link parameters) in the radio link established with each network.

To be specific, the radio link control unit 12A functions as an interface (device driver) with the radio communication unit 11A, and establishes a radio link supporting "WiMAX" with the first network 100. The radio link control unit 12B functions as an interface (device driver) with the radio communication unit 11B, and establishes a radio link supporting "1xEV-DO" with the second network 200.

The MIH function unit 13 controls handover among networks in response to an instruction from the MIH user 14 or the application processing unit 16 which functions as a higher layer than the MIH function unit 13. The MIH function unit 13 is a media independent handover function independent of the configuration of the physical layer, and is defined in IEEE802.21.

Here, the MIH function unit 13 manages various conditions for performing handover in the network to which its own terminal is connected. To be specific, the MIH function unit 13 manages, for each network, types of radio parameters, first thresholds (initiate action thresholds), second thresholds (execute action thresholds), a first logical expression for determination (hereinafter referred to as first logical expression) and a second logical expression for determination (hereinafter referred to as second logical expression).

Types of radio parameters indicate the radio parameters that should be monitored in the radio link established with the network to which the own terminal is connected.

For example, if the network to which the own terminal is connected is the first network 100, the radio link control unit 12A monitors the following radio parameters in the radio link established with the first network 100.

(a) signal to interference ratio (SINR)
(b) received signal strength indicator (RSSI)
(c) ratio of successful receipt of DL-MAP (Successful Ratio of DL-MAP Receive)
(d) transmission rate (Rate)
(e) uplink modulation class (Uplink Modulation Class)
(f) transmission power (Tx_Power)

If the network to which the own terminal is connected is the second network 200, the radio link control unit 12B monitors the following radio parameters in the radio link established with the second network 200.

(a) signal to interference ratio (SINR)
(b) received signal strength indicator (RSSI)
(c) DRC (data rate control)
(d) transmission power (Tx_Power)
(e) rate at which radio base station successfully receives DRC transmitted from radio terminal (DRC_Lock)

The first threshold (initiate action threshold) is a threshold set for each radio parameter to determine whether or not to make a handover preparation request (initiation action). Here, a handover preparation request (initiation action) is an operation for establishing a radio link with another network in a case where a radio link is established with a certain network.

For example, if the network to which the own terminal is connected is the first network 100, the first threshold set for the signal to interference ratio (SINR) is "3 dB." Similarly, "−75 dBm," "0.1," and "500 kbps" are set for the other radio parameters in this order.

If the network to which the own terminal is connected is the second network 200, the first threshold set for the signal to interference ratio (SINR) is "0 dB." Similarly, "−80 dBm," "6," "15 dBm" and "0.8" are set for the other radio parameters in this order.

The second threshold (execute action threshold) is a threshold set for each radio parameter to determine whether or not to make a handover execution request (execution action). Here, a handover execution request (execution action) is an operation for switching of the network to which the own terminal is connected in a case where a radio link is established with a certain network and another network (BU: binding update; RR: registration request; and the like). Note that a value of a situation where a radio environment is poorer than the first threshold (initiate action threshold) is set as the second threshold (execute action threshold).

For example, if the network to which the own terminal is connected is the first network 100, the second threshold set for the signal to interference ratio (SINR) is "−2 dB." Similarly, "−80 dBm," "0.8," "200 kbps," "QPSK ½," and "23 dBm" are set for the other radio parameters in this order.

If the network to which the own terminal is connected is the second network 200, the second threshold set for the signal to interference ratio (SINR) is "−5 dB." Similarly, "−90 dBm," "4," "23 dBm" and "0.8" are set for the other radio parameters in this order.

The first logical expression is a condition (first condition) for making the handover preparation request (initiation action). Specifically, the first logical expression indicates a combination of first thresholds that should be satisfied in respective radio parameters, in the radio link established with the network to which the own terminal is connected.

For example, if the network to which the own terminal is connected is the first network 100, and any of the following conditions is satisfied, the handover preparation request (initiation action) is made.

(a) All of SINR, RSSI and successful ratio of DL-MAP receive are poorer than the aforementioned first threshold.
(b) All of Tx_Power and uplink modulation class are poorer (lower) than the aforementioned first threshold.

If the network to which the own terminal is connected is the second network 200, and any of the following conditions is satisfied, the handover preparation request (initiation action) is made.

(a) All of SINR, RSSI and DRC are poorer than the aforementioned first threshold.
(b) All of Tx_Power and DRC_Lock are poorer than the aforementioned first threshold.

The second logical expression is a condition (second condition) for making the handover execution request (execution action). Specifically, the second logical expression indicates a combination of second thresholds that should be satisfied in respective radio parameters, in the radio link established with the network to which the own terminal is connected.

Note that although in the first embodiment, the combination of thresholds that should be satisfied in radio parameters is the same for the first logical expression and the second logical expression, the invention is not limited thereto. That is, the combination of thresholds that should be satisfied in radio parameters may differ between the first logical expression and the second logical expression.

The MIH user 14 is a mobility management unit configured to manage the mobility among networks in response to an instruction from the application processing unit 16 which functions as a higher layer than the MIH user 14. The MIH user 14 functions as a higher layer than the MIH function unit 13.

The buffer 15 temporarily stores packets received through the first network 100 or the second network 200.

Here, an appropriate packet amount is set for the buffer 15 according to a delay time of the network. An appropriate packet amount is determined from the viewpoint of suppressing shortage of packets and the viewpoint of maintaining real-time performance. The longer the delay time of the network, the larger the appropriate packet amount.

For example, in a case where the own terminal receives packets through the first network 100, the optimal packet amount of the buffer 15 (referred to below as first optimal packet amount) is determined according to a delay time of the first network 100. Similarly, in a case where the own terminal receives packets through the second network 200, the optimal packet amount of the buffer 15 (referred to below as second optimal packet amount) is determined according to a delay time of the second network 200.

As described above, the delay time of the first network 100 is shorter than the delay time of the second network 200. Accordingly, the first optimal packet amount is smaller than the second optimal packet amount.

The application processing unit 16 functions as a higher layer than the MIH user 14, and performs processing on various applications and the like. For example, the application processing unit 16 reproduces packets stored in the buffer 15 at a predetermined rate. The predetermined rate is determined according to the predetermined intervals at which the packets are received.

Here, the application processing unit 16 performs adaptive buffer control (referred to below as AJB (adaptive jitter buffer) control) of adjusting the packet reproduction rate to maintain the amount of buffer stored in the buffer 15 at the optimal packet amount.

For example, in a case where the own terminal receives packets through the first network 100, the application processing unit 16 adjusts the packet reproduction rate to maintain the amount of buffer stored in the buffer 15 at the first optimal packet amount. Similarly, in a case where the own terminal receives packets through the second network 200, the application processing unit 16 adjusts the packet reproduction rate to maintain the amount of buffer stored in the buffer 15 at the second optimal packet amount.

The application processing unit 16 stops the AJB control upon initiation of the handover preparation request from the first network 100 to the second network 200. When the handover from the first network 100 to the second network 200 is completed and the amount of buffer stored in the buffer 15 reaches the second optimal packet amount, the application processing unit 16 resumes the AJB control.

Here, it should be noted that the application processing unit 16 controls the packet reproduction rate apart from the AJB control, even during the period after stopping the AJB control and resuming the AJB control. Specifically, upon initiation of the handover preparation request from the first network 100 to the second network 200, the application processing unit 16 changes the packet reproduction rate to a rate slower than a predetermined rate. Here, it is preferable that an upper limit is set in the range for lowering the packet reproduction rate. For example, the range for lowering the packet reproduction rate is preferably 10 to 15% of the predetermined rate. Details of such control of the packet reproduction rate will be described later (see FIG. 4 to FIG. 6).

(Configuration of Communication Terminal)

Figure 3:
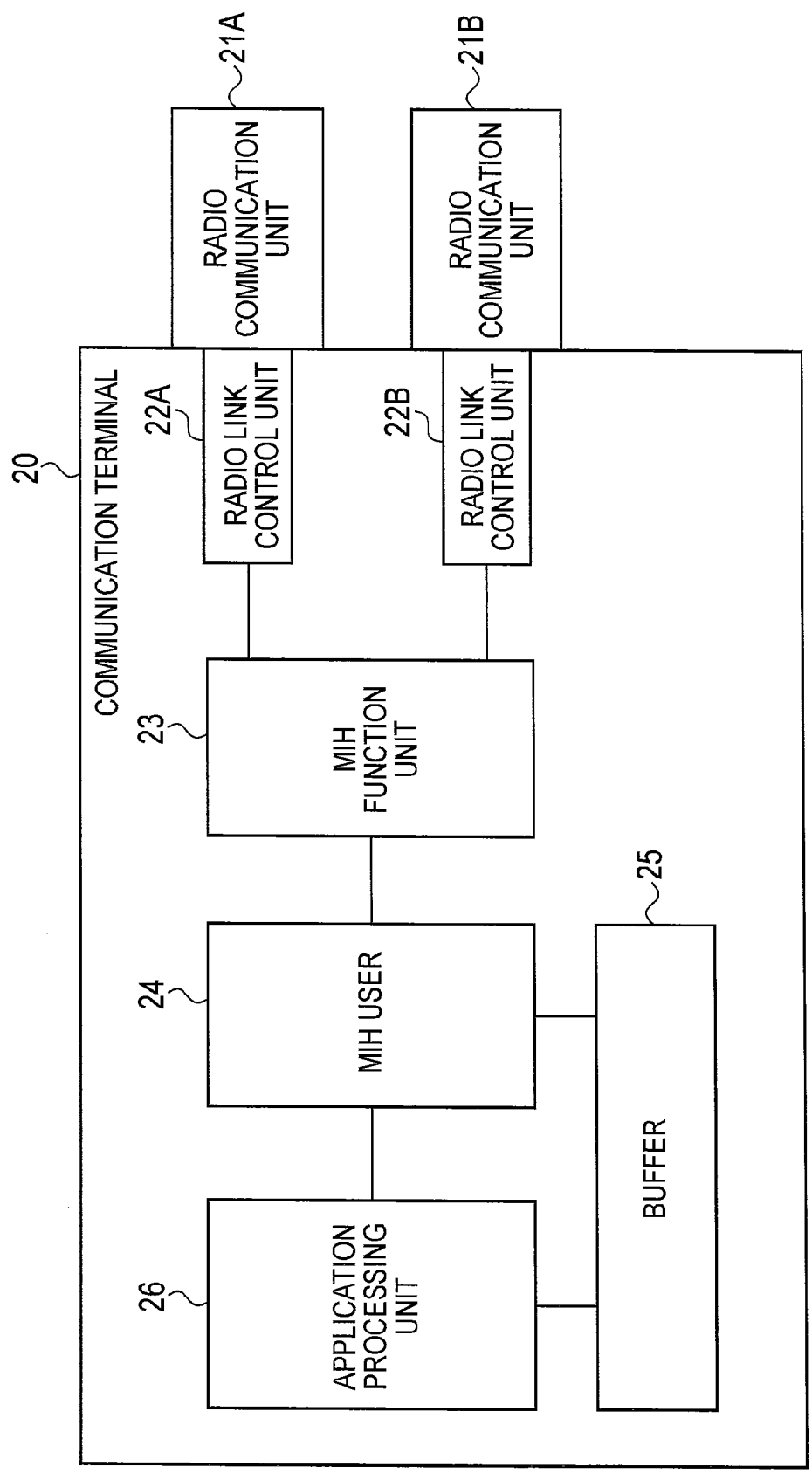
FIG. 3 is a block diagram showing a radio terminal 20 according to the first embodiment.

Hereinafter, a configuration of the communication terminal (CN: correspondent terminal) according to the first embodiment will be described with reference to the drawings. FIG. 3 is a block diagram showing the communication terminal 20 according to the first embodiment. Note that since the communication terminal 20 has the same configuration as the radio terminal 10, only an outline of the communication terminal 20 is described.

As shown in FIG. 3, the communication terminal 20 includes multiple radio communication units 21 (radio communication unit 21A and radio communication unit 21B), multiple radio link control units 22 (radio link control unit 22A and radio link control unit 22B), an MIH function unit 23, an MIH user 24, a buffer 25 and an application processing unit 26.

The radio communication unit 21 establishes a physical radio connection in the physical layer with each network, in response to an instruction from a higher layer (such as the MIH function unit 23 and the application processing unit 26). The radio communication unit 21 transmits packets to the radio terminal 10 at predetermined intervals. Moreover, the radio communication unit 21 transmits retransmission packets to the radio terminal 10 at intervals shorter than the predetermined intervals. Note that the radio communication unit 21 transmits the retransmission packets with a lower coding rate than the packets transmitted at the predetermined intervals.

A retransmission packet is a packet which the radio terminal 10 is unable to receive normally (lost packet) in handover from the first network 100 to the second network 200. For example, in a case where the radio terminal 10 performs handover from the first network 100 to the second network 200, a retransmission packet refers to a lost packet discarded inside the radio terminal 10 (discard), a lost packet due to a gap from a difference in delay times of the first network 100 and the second network 200, or the like.

The radio link control unit 22 establishes a radio link in the link layer with each network, in response to an instruction from a higher layer (such as the MIH function unit 23 and the application processing unit 26).

The MIH function unit 23 controls handover among networks in response to an instruction from the MIH user 24 or the application processing unit 26 which functions as a higher layer than the MIH function unit 23. The MIH function unit 23 is a media independent handover function independent of the configuration of the physical layer, and is defined in IEEE802.21.

The MIH user 24 is a mobility management unit configured to manage the mobility among networks in response to an instruction from the application processing unit 26 which functions as a higher layer than the MIH user 24. The MIH user 24 functions as a higher layer than the MIH function unit 23.

The buffer 25 temporarily stores packets received from the backbone network 300 through the first network 100 or the second network 200. An appropriate packet amount is set for the buffer 25 according to a delay time of the network. An appropriate packet amount is determined from the viewpoint of suppressing shortage of packets and the viewpoint of maintaining real-time performance. The longer the delay time of the network, the larger the appropriate packet amount.

For example, in a case where packets are received from the radio terminal 10 through the first network 100, the optimal packet amount of the buffer 15 is determined according to a delay time of the first network 100. Similarly, in a case where packets are received from the radio terminal 10 through the second network 200, the optimal packet amount of the buffer 15 is determined according to a delay time of the second network 200.

The application processing unit 26 functions as a higher layer than the MIH user 24, and performs processing on various applications and the like. For example, the application processing unit 26 controls the transmission intervals of retransmission packets and the coding rate.

Specifically, the application processing unit 26 calculates the amount of retransmission packets (i.e., lost packets) on the basis of a delay time of the first network 100 and a delay time of the second network 200. The application processing unit 26 instructs the radio communication unit 21 to transmit the retransmission packets at intervals shorter than the predetermined intervals. In addition, the application processing unit 26 instructs the radio communication unit 21 to transmit the retransmission packets with a lower coding rate than the packets transmitted at the predetermined intervals.

(Example of Packet Reproduction Rate Control)

Hereinafter, an example of a packet reproduction rate control according to the first embodiment will be described with reference to FIGS. 4 to 6. Hereinafter, a delay time of a packet transmitted from the communication terminal 20 to the radio terminal 10 through the first network 100 is expressed as "Dold_dn," and a delay time of a packet transmitted from the radio terminal 10 to the communication terminal 20 through the first network 100 is expressed as "Dold_up." Similarly, a delay time of a packet transmitted from the communication terminal 20 to the radio terminal 10 through the second network 200 is expressed as "Dnew_dn," and a delay time of a packet transmitted from the radio terminal 10 to the communication terminal 20 through the second network 200 is expressed as "Dnew_up."

(Example 1 of Packet Reproduction Rate Control)

Hereinafter, an example 1 of a packet reproduction rate control according to the first embodiment will be described with reference to the drawings. FIG. 4 is a diagram showing the example 1 of a packet reproduction rate control according to the first embodiment. Here, a case where the radio terminal 10 corresponds to a SCoA (single care of address) is exemplified. With the SCoA, the radio terminal 10 receives packets through one of the first network 100 and the second network 200.

At time $t_1$, the radio terminal 10 transmits a handover preparation request to the home agent 30. In other words, at time $t_1$, the first logical expression is satisfied. At time $t_1$, the radio terminal 10 changes the packet reproduction rate to a lower (slower) rate than the predetermined rate. In addition, at time $t_1$, the radio terminal1 10 stops the AJB control.

At time $t_2$, the radio terminal 10 transmits a handover execution request to the home agent 30. In other words, at time $t_2$, the second logical expression is satisfied. It should be noted that since the packet reproduction rate is lower (slower) than the predetermined rate between time $t_1$ and time $t_2$, the amount of packets stored in the buffer 15 increases during this period.

At time $t_3$, the radio terminal 10 detects that the amount of packets stored in the buffer 15 has reached the predetermined packet amount. At time $t_3$, the radio terminal 10 changes the packet reproduction rate back to the predetermined rate. It should be noted that although packets are discarded in the radio terminal 10 between time $t_2$ and time $t_3$, the packet reproduction rate is lower (slower) than the predetermined rate and thus the decrease in the amount of packets stored in the buffer 15 is suppressed during this period.

Here, the predetermined packet amount is calculated on the basis of a delay time of the first network 100 and a delay time of the second network 200. For example, the predetermined packet amount is calculated on the basis of the amount of retransmission packets and a gap period.

The amount of retransmission packets is an amount corresponding to lost (discarded) packets. The amount (number) of retransmitted packets from the communication terminal 20 to the radio terminal 10 is calculated by "(Dold_dn+Dnew_up)/predetermined intervals (frame periods)."

A gap period is a period in which the radio terminal 10 cannot receive packets from the communication terminal 20. The gap period is calculated by "Dnew_dn×2+Dnew_up−Dold_up."

Specifically, the predetermined packet amount is calculated such that the amount of packets stored in the buffer 15 reaches the second optimal packet amount at a timing (time $t_5$) when the radio terminal 10 receives the last retransmission packet of the retransmission packets transmitted from the communication terminal 20.

Here, the range for lowering the packet reproduction rate is constant, an upper limit is set in the range for lowering the packet reproduction rate, and the time until actual execution of the handover is adjusted. In other words, parameters for handover preparation/handover execution are adjusted so that a sufficiently long handover preparation period can be ensured to store the amount of packets corresponding to the gap period.

At time $t_4$, the radio terminal 10 receives a handover completion notification from the home agent 30. Between time $t_4$ and time $t_5$, the radio terminal 10 receives retransmission packets at intervals shorter than the predetermined intervals through the second network 200.

That is to say, upon receipt of the handover execution request, the communication terminal 20 transmits retransmission packets at intervals shorter than the predetermined intervals through the second network 200. As described above, the communication terminal 20 transmits the retransmission packets with lower coding rates than the packets transmitted at the predetermined intervals.

At time $t_5$, the radio terminal 10 detects that the amount of packets stored in the buffer 15 has reached the second optimal packet amount. At time $t_5$, the radio terminal 10 changes the packet reproduction rate back to the predetermined rate and resumes the AJB control. Here, time $t_5$ is a timing at which the radio terminal 10 receives the last retransmission packet of the retransmission packets transmitted from the communication terminal 20.

(Example 2 of Packet Reproduction Rate Control)

Hereinafter, an example 2 of a packet reproduction rate control according to the first embodiment will be described with reference to the drawings. FIG. 5 is a diagram showing the example 2 of a packet reproduction rate control according to the first embodiment. Here, a case where the radio terminal 10 corresponds to a SCoA (single care of address) is exemplified.

At time $t_1$, the radio terminal 10 transmits a handover preparation request to the home agent 30. In other words, at time $t_1$, the first logical expression is satisfied. At time $t_1$, the radio terminal 10 changes the packet reproduction rate to a lower (slower) rate than the predetermined rate. In addition, at time $t_1$, the radio terminal 10 stops the AJB control.

At time $t_2$, the radio terminal 10 transmits a handover execution request to the home agent 30. In other words, at time $t_2$, the second logical expression is satisfied. It should be noted that since the packet reproduction rate is lower (slower) than the predetermined rate between time $t_1$ and time $t_2$, the amount of packets stored in the buffer 15 increases during this period. It should be noted that if the period between time $t_1$ and time $t_2$ is sufficiently long, the amount of packets stored in the buffer 15 may exceed the second optimal packet amount.

At time $t_3$, the radio terminal 10 detects that the amount of packets stored in the buffer 15 has reached the predetermined packet amount (second optimal packet amount, for example). At time $t_3$, the radio terminal 10 changes the packet reproduction rate back to the predetermined rate. Here, the predetermined packet amount is calculated on the basis of a delay time of the second network 200.

It should be noted that although packets are discarded in the radio terminal 10 between time $t_2$ and time $t_3$, the packet reproduction rate is lower (slower) than the predetermined rate and thus the decrease in the amount of packets stored in the buffer 15 is suppressed during this period.

Here, with regard to a period in which the radio terminal 10 cannot receive packets from the communication terminal 20 (hereinafter referred to as gap period), it is preferable that the packets stored in the buffer 15 not be exhausted. The gap period is calculated by "Dnew_dn×2+Dnew_up−Dold_up."

The range for lowering the packet reproduction rate is constant, an upper limit is set in the range for lowering the packet reproduction rate, and the time until actual execution of the handover is adjusted. In other words, parameters for handover preparation/handover execution are adjusted so that a sufficiently long handover preparation period can be ensured to store the amount of packets corresponding to the gap period.

At time $t_4$, the radio terminal 10 receives a handover completion notification from the home agent 30. Upon receipt of a handover completion notification, the radio terminal 10 changes the packet reproduction rate to a rate higher (faster) than the predetermined rate. Between time $t_4$ and time $t_5$, the radio terminal 10 receives retransmission packets at intervals shorter than the predetermined intervals through the second network 200.

That is to say, upon receipt of the handover execution request, the communication terminal 20 transmits retransmission packets at intervals shorter than the predetermined intervals through the second network 200. As described above, the communication terminal 20 transmits the retransmission packets with lower coding rates than the packets transmitted at the predetermined intervals.

At time $t_5$, the radio terminal 10 detects that the amount of packets stored in the buffer 15 has reached the second optimal packet amount. At time $t_5$, the radio terminal 10 changes the packet reproduction rate back to the predetermined rate and resumes the AJB control.

(Example 3 of Packet Reproduction Rate Control)

Hereinafter, an example 3 of a packet reproduction rate control according to the first embodiment will be described with reference to the drawings. FIG. 6 is a diagram showing the example 3 of a packet reproduction rate control according to the first embodiment. Here, a case where the radio terminal 10 corresponds to a MCoA (multi care of address) is exemplified. With the MCoA, the radio terminal 10 receives packets through both of the first network 100 and the second network 200.

At time $t_1$, the radio terminal 10 transmits a handover preparation request to the home agent 30. In other words, at time $t_1$, the first logical expression is satisfied. At time $t_1$, the radio terminal 10 changes the packet reproduction rate to a lower (slower) rate than the predetermined rate. In addition, at time $t_1$, the radio terminal 10 stops the AJB control.

At time $t_2$, the radio terminal 10 transmits a handover execution request to the home agent 30. In other words, at time $t_2$, the second logical expression is satisfied. It should be noted that since the packet reproduction rate is lower (slower) than the predetermined rate between time $t_1$ and time $t_2$, the amount of packets stored in the buffer 15 increases during this period.

At time $t_3$, the radio terminal 10 detects that the amount of packets stored in the buffer 15 has reached the predetermined packet amount. At time $t_3$, the radio terminal 10 changes the packet reproduction rate back to the predetermined rate.

Here, the predetermined packet amount is calculated on the basis of a delay time of the first network 100 and a delay time of the second network 200. For example, the predetermined packet amount is calculated on the basis of a period in which the radio terminal 10 cannot receive packets from the communication terminal 20 (gap period). The gap period is calculated by "Dnew_dn−Dold_dn." Specifically, the predetermined packet amount is calculated such that the amount of packets stored in the buffer 15 reaches the second optimal packet amount at a timing (time $t_5$) when the radio terminal 10 receives the first packet of the packets received through the second network 200.

At time $t_4$, the radio terminal 10 receives a handover completion notification from the home agent 30.

At time $t_5$, the radio terminal 10 detects that the amount of packets stored in the buffer 15 has reached the second optimal packet amount. At time $t_5$, the radio terminal 10 changes the packet reproduction rate back to the predetermined rate and resumes the AJB control. Here, time $t_5$ is a timing at which the radio terminal 10 receives the first packet of the packets received from the communication terminal 20 through the second network 200.

(Operation of Communication System)

Hereinafter, an operation of a communication system according to the first embodiment will be described with reference to the drawings. FIG. 7 is a sequence diagram showing the operation of the communication system according to the first embodiment.

As shown in FIG. 7, in step 10, the application processing unit 16 notifies the MIH user 14 of a service quality required for a new application (QoS Requirement).

In step 11, the MIH user 14 notifies the MIH function unit 13 of a threshold setting request (MIH_Configure. request) to request setting of thresholds for radio parameters that should be monitored in a radio link established with the first network 100.

In step 12, in response to the threshold setting request (MIH Configure. request), the MIH function unit 13 notifies the radio link control unit 12A of a condition setting request (Link_Configure_Threshold. request) to request setting of conditions for handover from the first network 100 to the second network 200.

The condition setting request (Link_Configure_Threshold.request) at least includes a condition for making a handover preparation request (initiation action) (first condition) and a condition for making a handover execution request (execute action) (second condition).

In step 13, the radio link control unit 12A notifies the MIH function unit 13 of Link_Configure_Threshold. confirm indicating that the setting of conditions is completed.

In step 14, the MIH function unit 13 notifies the MIH user 14 of MIH_Configure. confirm indicating that the setting of thresholds is completed.

In step 15, the radio link control unit 12A monitors whether or not a radio parameter value in the radio link established with the first network 100 becomes poorer than the first threshold specified by the MIH function unit 13. Subsequently, the radio link control unit 12A determines whether or not each radio parameter value satisfies the first logical expression. Here, the description continues on the assumption that the first logical expression has been satisfied.

In step 16, the radio link control unit 12A notifies the MIH function unit 13 of Link_Parameters_Report. indication indicating a radio parameter value in the radio link established with the first network 100.

Specifically, Link_Parameters_Report. indication includes an old radio parameter value, a new radio parameter value, a type of operation and a logical expression for determination.

An old radio parameter value is a value notified to the MIH function unit 13 last time, and a new radio parameter value is a value to be notified to the MIH function unit 13 this time. A type of operation is information indicating a handover preparation request (initiation action) or a handover execution request (execute action). A logical expression for determination is information indicating the first logical expression (initiation action) or the second logical expression (execute action).

Note that in step 16, a handover preparation request (initiation action) is set as the type of operation, and the first logical expression (initiation action) is set as the logical expression for determination.

In step 17, the MIH function unit 13 notifies the MIH user 14 of MIH_Link_Parameters_Report. indication indicating a radio parameter value in the radio link established with the first network 100.

In step 18, the MIH user 14 notifies the MIH function unit 13 of MIH_Handover_Prepare. request to request a handover preparation request (initiation action).

In step 19, the MIH function unit 13 notifies the radio link control unit 12B of Link_Up. request to request to establish the radio link with the second network 200.

In step 20, the radio link control unit 12B establishes the radio link with the second network 200. Note that the radio communication unit 11B establishes a physical radio connection with the second network 200 before establishment of the radio link, as a matter of course.

In step 21, the radio link control unit 12B notifies the MIH function unit 13 of Link_Up. indication indicating that the radio link is established with the second network 200.

In step 22, the MIH function unit 13 notifies the MIH user 14 of MIH_Handover_Prepare. confirm indicating that the handover preparation request (initiation action) is completed.

In step 23, the MIH user 14 transmits a handover preparation request to the home agent 30. The home agent 30 transmits the handover preparation request to the communication terminal 20 (correspondent terminal).

In step 24, the MIH user 14 notifies the application processing unit 16 of a handover preparation confirmation indicating that the handover preparation request has been transmitted.

In step 25, the application processing unit 16 transmits information indicating delay times of the first network 100 and the second network 200 (Delay and Jitter Information Indication) to the communication terminal 20. The application processing unit 16 may notify the communication terminal 20 of the amount (number) of retransmission packets corresponding to the packets that the own terminal cannot receive normally (lost packets) by the "Delay and Jitter Information Indication." The application processing unit 16 may notify the communication terminal 20 of the coding rate or transmission rate of the retransmission packets by the "Delay and Jitter Information Indication."

In step 26, the communication terminal 20 calculates the amount (number) of retransmission packets corresponding to the packets that the radio terminal 10 cannot receive normally (lost packets), on the basis of the delay times of the first network 100 and the second network 200.

In step 27, the application processing unit 16 calculates the optimal packet amount in the second network 200 (second optimal packet amount), on the basis of the delay time of the second network 200.

In step 28, the application processing unit 16 stops the AJB control.

In step 29, the application processing unit 16 changes the packet reproduction rate to a rate slower than the predetermined rate.

In step 30, the radio link control unit 12A monitors whether or not a radio parameter value in the radio link established with the first network 100 becomes poorer than the second threshold specified by the MIH function unit 13. Subsequently, the radio link control unit 12A determines whether or not each radio parameter value satisfies the second logical expression. Here, the description continues on the assumption that the second logical expression has been satisfied.

In step 31, the radio link control unit 12A notifies the MIH function unit 13 of Link_Parameters_Report. indication indicating a radio parameter value in the radio link established with the first network 100. Here, Link_Parameters_Report. indication is the same as the information transmitted in the aforementioned step 16.

Note that in step 31, a handover execution request (execute action) is set as the type of operation, and the second logical expression (execute action) is set as the logical expression for determination.

In step 32, the MIH function unit 13 notifies the MIH user 14 of MIH_Link_Parameters_Report. indication indicating a radio parameter value in the radio link established with the first network 100.

In step 33, the MIH user 14 transmits a handover execution request to the home agent 30. The home agent 30 transmits the handover execution request to the communication terminal 20.

In step 34, the MIH user 14 notifies the application processing unit 16 of a handover execution request confirmation indicating that the handover execution request has been transmitted.

In step 35, the MIH user 14 notifies the MIH function unit 13 of MIH_Swich to instruct switching of the network to which the own terminal is connected.

In step 36, the MIH function unit 13 switches the network to which the own terminal is connected, from the first network 100 to the second network 200.

In step 37, the MIH function unit 13 notifies the MIH user 14 of MIH_Commit. request to confirm completion of the handover.

In step 38, the home agent 30 transmits a handover completion notification to the MIH user 14.

In step 39, the MIH user 14 notifies the MIH function unit 13 of MIH_Handover_Complete. request to request completion of the handover.

In step 40, the MIH function unit 13 notifies the radio link control unit 12A of Link_Teardown. Request to request releasing of the radio link established with the first network 100.

In step 41, the radio link control unit 12A releases the radio link established with the first network 100.

In step 42, the radio link control unit 12A notifies the MIH function unit 13 of Link_Parameters_Report. indication indicating that the release of the radio link established with the first network 100 is completed.

In step 43, the MIH function unit 13 notifies the MIH user 14 of MIH_Handover_Complete. response indicating that the handover is completed.

In step 44, the MIH user 14 notifies the application processing unit 16 of a handover completion notification confirmation indicating that the handover completion notification has been received.

In step 45, the communication terminal 20 transmits retransmission packets corresponding to lost packets to the radio terminal 10. It is preferable that the communication terminal 20 transmit the retransmission packets at a lower coding rate than the packets transmitted at the predetermined intervals.

In step 46, the application processing unit 16 resumes the AJB control.

Note that as has been shown in the examples of reproduction rate control 1 to 3, the application processing unit 16 appropriately controls the packet reproduction rate during step 28 to step 46.

(Advantageous Effects)

In the first embodiment, the radio terminal 10 changes the packet reproduction rate to a rate slower than the predetermined rate after transmission of a handover preparation request. Accordingly, it is possible to promptly bring the amount of packets stored in the buffer 15 close to the optimal packet amount in the second network 200 (the second optimal packet amount), after handover from the first network 100 to the second network 200. It is also possible to suppress packet losses.

In the first embodiment, the radio terminal 10 stops the AJB control after transmission of the handover preparation request. Accordingly, it is possible to suppress abrupt changes in the packet reproduction rate due to the AJB control, when handover is performed from the first network 100 to the second network 200.

[Second Embodiment]

Hereinbelow, a second embodiment will be described with reference to the drawings. The following description will be given mainly of differences between the first embodiment and the second embodiment.

The first embodiment has been described mainly by referring to a flow of packets from the communication terminal 20 to the radio terminal 10. In contrast, the second embodiment will be described by referring mainly to a flow of packets from the radio terminal 10 to the communication terminal 20.

That is, the second embodiment is different from the first embodiment in that the functions of the application processing unit 16 of the radio terminal 10 is switched with the functions of the application processing unit 26 of the communication terminal 20. To be more specific, the application processing unit 26 of the communication terminal 20 has the functions of the application processing unit 16 of the first embodiment. The application processing unit 16 of the radio terminal 10 has the functions of the application processing unit 26 of the first embodiment.

In the second embodiment, in the same manner as the first embodiment, a delay time of the first network 100 is shorter than a delay time of the second network 200. In the second embodiment, in the same manner as the first embodiment, the radio terminal 10 performs handover from the first network 100 to the second network 200.

Note that a delay time of a network is a concept which includes not only a time that a packet from the radio terminal 10 held in the network (holding time) but also variation (jitter) in the holding time. A holding time is correlated with jitter. Generally, the longer the holding time, the larger the jitter.

(Example of Packet Reproduction Rate Control)

Hereinafter, an example of a packet reproduction rate control will be described with reference to FIGS. 8 to 10. Hereinafter, a delay time of a packet transmitted from the communication terminal 20 to the radio terminal 10 through the first network 100 is expressed as "Dold_dn," and a delay time of a packet transmitted from the radio terminal 10 to the communication terminal 20 through the first network 100 is expressed as "Dold_up." Similarly, a delay time of a packet transmitted from the communication terminal 20 to the radio terminal 10 through the first network 100 is expressed as "Dnew_dn," and a delay time of a packet transmitted from the radio terminal 10 to the communication terminal 20 through the second network 200 is expressed as "Dnew_up."

(Example 1 of Packet Reproduction Rate Control)

Hereinafter, an example 1 of a packet reproduction rate control according to the second embodiment will be described with reference to the drawings. FIG. 8 is a diagram showing the example 1 of a packet reproduction rate control according to the second embodiment. Here, a case where the radio terminal 10 corresponds to a SCoA (single care of address) is exemplified. With the SCoA, the radio terminal 10 transmits packets through one of the first network 100 and the second network 200.

At time $t_1$, the communication terminal 20 receives a handover preparation request from the home agent 30. At time $t_1$, the communication terminal 20 changes the packet reproduction rate to a lower (slower) rate than the predetermined rate. In addition, at time $t_1$, the communication terminal 20 stops the AJB control.

At time $t_2$, the communication terminal 20 receives a handover execution request from the home agent 30. It should be noted that since the packet reproduction rate is lower (slower) than the predetermined rate between time $t_1$ and time $t_2$, the amount of packets stored in the buffer 25 increases during this period.

At time $t_3$, the communication terminal 20 detects that the amount of packets stored in the buffer 25 has reached the predetermined packet amount. At time $t_3$, the communication terminal 20 changes the packet reproduction rate back to the predetermined rate. It should be noted that although packets are discarded in communication terminal 20 between time $t_2$ and time $t_3$, the packet reproduction rate is lower (slower) than the predetermined rate and thus the decrease in the amount of packets stored in the buffer 25 is suppressed during this period. Additionally, it should be noted that time $t_3$ is a time before a timing at which the communication terminal 20 receives the first packet (retransmission packet in this example) of the packets received through the second network 200.

Here, the predetermined packet amount is calculated on the basis of a delay time of the first network 100 and a delay time of the second network 200. For example, the predetermined packet amount is calculated on the basis of the amount of retransmission packets and a gap period.

The amount of retransmission packets is an amount corresponding to lost (discarded) packets. The amount (number) of retransmitted packets from the radio terminal 10 to the communication terminal 20 is calculated by "(Dold_dn+Dnew_up)/predetermined intervals (frame periods)."

A gap period is a period in which the communication terminal 20 cannot receive packets from the radio terminal 10. The gap period is calculated by "Dnew_up−Dnew_dn."

Specifically, the predetermined packet amount is calculated such that the amount of packets stored in the buffer 25 reaches the second optimal packet amount at a timing (time $t_4$) when the communication terminal 20 receives the last retransmission packet of the retransmission packets transmitted from the radio terminal 10.

Here, the range for lowering the packet reproduction rate is constant, an upper limit is set in the range for lowering the packet reproduction rate, and the time until actual execution of the handover is adjusted. In other words, parameters for handover preparation/handover execution are adjusted so that a sufficiently long handover preparation period can be ensured to store the amount of packets corresponding to the gap period.

Between time $t_3$ and time $t_4$, the communication terminal 20 receives retransmission packets at intervals shorter than the predetermined intervals through the second network 200.

That is to say, upon receipt of the handover completion notification, the radio terminal 10 transmits retransmission packets at intervals shorter than the predetermined intervals through the second network 200. As described above, the radio terminal 10 transmits the retransmission packets with lower coding rates than the packets transmitted at the predetermined intervals.

At time $t_4$, the communication terminal 20 detects that the amount of packets stored in the buffer 25 has reached the second optimal packet amount. At time $t_4$, the communication terminal 20 changes the packet reproduction rate back to the predetermined rate and resumes the AJB control. Here, time $t_4$ is a timing at which communication terminal 20 receives the last retransmission packet of the retransmission packets transmitted from the radio terminal 10.

(Example 2 of Packet Reproduction Rate Control)

Hereinafter, an example 2 of a packet reproduction rate control according to the second embodiment will be described with reference to the drawings. FIG. 9 is a diagram showing the example 2 of a packet reproduction rate control according to the second embodiment. Here, a case where the radio terminal 10 corresponds to a SCoA (single care of address) is exemplified.

At time $t_1$, the communication terminal 20 receives a handover preparation request from the home agent 30. At time $t_1$, the communication terminal 20 changes the packet reproduction rate to a lower (slower) rate than the predetermined rate. In addition, at time $t_1$, the communication terminal 20 stops the AJB control.

At time $t_1$, the communication terminal 20 receives a handover execution request from the home agent 30. It should be noted that since the packet reproduction rate is lower (slower) than the predetermined rate between time $t_1$ and time $t_2$, the amount of packets stored in the buffer 25 increases during this period. It should be noted that if the period between time $t_1$ and time $t_2$ is sufficiently long, the amount of packets stored in the buffer 25 may exceed the second optimal packet amount.

At time $t_3$, the communication terminal 20 detects that the amount of packets stored in the buffer 25 has reached the predetermined packet amount (second optimal packet amount, for example). At time $t_3$, the communication terminal 20 changes the packet reproduction rate back to the predetermined rate. Here, the predetermined packet amount is calculated on the basis of a delay time of the second network 200.

It should be noted that although packets are discarded in the communication terminal 20 between time $t_2$ and time $t_3$, the packet reproduction rate is lower (slower) than the predetermined rate and thus the decrease in the amount of packets stored in the buffer 25 is suppressed during this period. Additionally, it should be noted that time $t_3$ is a time before a timing at which the communication terminal 20 receives the first packet (retransmission packet in this example) of the packets received through the second network 200.

Here, with regard to a period in which the communication terminal 20 cannot receive packets from the radio terminal 10 (hereinafter referred to as gap period), it is preferable that the packets stored in the buffer 25 not be exhausted. The gap period is calculated by "Dnew_up–Dnew_dn."

The range for lowering the packet reproduction rate is constant, an upper limit is set in the range for lowering the packet reproduction rate, and the time until actual execution of the handover is adjusted. In other words, parameters for handover preparation/handover execution are adjusted so that a sufficiently long handover preparation period can be ensured to store the amount of packets corresponding to the gap period.

At time $t_4$, the communication terminal 20 receives the first packet (retransmission packet in this example) of the packets received through the second network 200. Upon receipt of the first packet, the communication terminal 20 changes the packet reproduction rate to a rate higher (faster) than the predetermined rate.

Between time $t_4$ and time $t_5$, the communication terminal 20 receives retransmission packets at intervals shorter than the predetermined intervals through the second network 200.

That is to say, upon receipt of the handover completion notification, the radio terminal 10 transmits retransmission packets at intervals shorter than the predetermined intervals through the second network 200. The radio terminal 10 transmits the retransmission packets with lower coding rates than the packets transmitted at the predetermined intervals.

At time $t_5$, the communication terminal 20 detects that the amount of packets stored in the buffer 25 has reached the second optimal packet amount. At time $t_5$, the communication terminal 20 changes the packet reproduction rate back to the predetermined rate and resumes the AJB control.

(Example 3 of Packet Reproduction Rate Control)

Hereinafter, an example 3 of a packet reproduction rate control according to the second embodiment will be described with reference to the drawings. FIG. 10 is a diagram showing the example 3 of a packet reproduction rate control according to the second embodiment. Here, a case where the radio terminal 10 corresponds to a MCoA (multi care of address) is exemplified. With the MCoA, the radio terminal 10 transmits packets through both of the first network 100 and the second network 200.

At time $t_1$, the communication terminal 20 receives a handover preparation request from the home agent 30. At time $t_1$, the communication terminal 20 changes the packet reproduction rate to a lower (slower) rate than the predetermined rate. In addition, at time $t_1$, the communication terminal 20 stops the AJB control.

At time $t_2$, the communication terminal 20 receives a handover execution request from the home agent 30. It should be noted that since the packet reproduction rate is lower (slower) than the predetermined rate between time $t_1$ and time $t_2$, the amount of packets stored in the buffer 25 increases during this period.

At time $t_3$, the communication terminal 20 detects that the amount of packets stored in the buffer 25 has reached the predetermined packet amount. At time $t_3$, the communication terminal 20 changes the packet reproduction rate back to the predetermined rate. It should be noted that since the packet reproduction rate is lower (slower) than the predetermined rate between time $t_2$ and time $t_3$, the amount of packets stored in the buffer 25 increases during this period.

Here, the predetermined packet amount is calculated on the basis of a delay time of the first network 100 and a delay time of the second network 200. For example, the predetermined packet amount is calculated on the basis of a period in which the radio terminal 10 cannot receive packets from the communication terminal 20 (gap period). The gap period is calculated by "Dnew_dn–Dold_dn." Specifically, the predetermined packet amount is calculated such that the amount of packets stored in the buffer 25 reaches the second optimal packet amount at a timing (time $t_4$) when the communication terminal 20 receives the first packet of the packets received through the second network 200.

At time $t_4$, the communication terminal 20 detects that the amount of packets stored in the buffer 25 has reached the second optimal packet amount. At time $t_4$, the communication terminal 20 resumes the AJB control. Here, time $t_4$ is a timing at which the communication terminal 20 receives the first packet of the packets transmitted from the radio terminal 10 through the second network 200.

(Operation of Communication System)

Hereinafter, an operation of a communication system according to the second embodiment will be described with reference to the drawings. FIG. 11 is a sequence diagram showing the operation of the communication system according to the second embodiment. The same processing as that in FIG. 7 is assigned the same step number in FIG. 11. Here, descriptions of the same processing as that in FIG. 7 are omitted.

In the second embodiment as shown in FIG. 11, processing of step 26A to step 29A, step 45A and step 46A is performed instead of the processing of step 26 to step 29, step 45 and step 46 shown in FIG. 7.

In step 26A, the application processing unit 16 calculates the amount of retransmission packets corresponding to the packets that the communication terminal 20 (correspondent terminal) cannot receive normally (lost packets), on the basis of the delay times of the first network 100 and the second network 200.

In step 27A, the communication terminal 20 (correspondent terminal) calculates the optimal packet amount in the second network 200 (second optimal packet amount), on the basis of the delay time of the second network 200.

In step 28A, the communication terminal 20 stops the AJB control.

In step 29A, the communication terminal 20 changes the packet reproduction rate to a slower rate than the predetermined rate.

In step 45A, the application processing unit 16 transmits retransmission packets corresponding to lost packets to the communication terminal 20. It is preferable that the application processing unit 16 transmit the retransmission packets at a lower coding rate than the packets transmitted at the predetermined intervals.

In step 46A, the communication terminal 20 resumes the AJB control.

Note that as has been shown in the examples of reproduction rate control 1 to 3, the communication terminal 20 appropriately controls the packet reproduction rate during step 28A to step 46A.

(Advantageous Effects)

In the second embodiment, the communication terminal 20 changes the packet reproduction rate to a rate slower than the predetermined rate after receipt of a handover preparation request. Accordingly, it is possible to promptly bring the amount of buffer stored in the buffer 25 close to the optimal packet amount in the second network 200 (the second optimal packet amount), after handover of the radio terminal 10 from the first network 100 to the second network 200. It is also possible to suppress packet losses.

In the second embodiment, the communication terminal 20 stops the AJB control after receipt of the handover preparation request. Accordingly, it is possible to suppress abrupt changes in the packet reproduction rate due to the AJB control, when handover is performed by the radio terminal 10 from the first network 100 to the second network 200.

[Other Embodiments]

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

For example, the operation of the radio terminal 10 can be provided as a program executable on a computer. Similarly, the operation of the communication terminal 20 can be provided as a program executable on a computer.

Although not particularly mentioned in the above embodiments, the delay times of the first network 100 and the second network 200 may be known to the radio terminal 10. Alternatively, the delay times of the first network 100 and the second network 200 may be measured by the radio terminal 10.

(1) Measurement method 1

A measurement method 1 is a method for measuring a delay time at the application processing unit 16 of the radio terminal 10 and the application processing unit 26 of the communication terminal 20.

Here, a measurement of the delay time of the second network 200 at the application processing unit 16 when the radio terminal 10 performs the handover from the first network 100 to the second network 200 will be described with reference to the FIG. 7 or FIG. 11. Specifically, the operation performed between step 24 and step 25 will be described.

In step 24, the application processing unit 16 transmits a measurement request message for requesting the measurement of the delay time of the second network 200, to the application processing unit 26 of the communication terminal 20, when the handover preparation confirmation is notified from the MIH user 14. The measurement request message is a message using SIP (Session Initiation Protocol), for example.

The application processing unit 26 transmits a measurement request response message which is response for the measurement request message, to the application processing unit 16 of the radio terminal 10, as receiving the measurement request message. The measurement request response message is a message using SIP (Session Initiation Protocol), for example.

The application processing unit 16 transmits a packet for measurement for measuring the delay time of the second network 200, to the application processing unit 26 of the communication terminal 20, as receiving the measurement request response message. The packet for measurement is a packet conform to the ICMP (Internet Control Message Protocol), for example, and includes a time stamp indicating transmitting time of the packet for measurement.

As receiving the packet for measurement, the application processing unit 26 specifies the transmitting time from the time stamp included in the packet for measurement, and measures the difference of a receiving time of the packet for measurement and the specified transmitting time as the holding time of the second network 200. The measured holding time is a holding time of a link (referred to below as uplink) from the radio terminal 10 to the communication terminal 20.

The application processing unit 26 repeat such process for multiple time, and measure a jitter expressing variation of the holding time by measuring the holding time for respective packet for measurement. Alternately, if respective packet for measurement is transmitted at constant transmission time interval, the application processing unit 26 measures the jitter from difference of respective receiving time of the packet for measurement.

The application processing unit 26 transmits information (Delay and Jitter Information Indication) indicating a measurement result of the uplink delay time (holding time and jitter) to the application processing unit 16 of the radio terminal 10. Thus, the application processing unit 16 and the application processing unit 26 can grasp the uplink delay time, and may use the delay time for various determination or control in the above described embodiments.

On the contrary, a delay time of a link (referred to below as downlink) from the communication terminal 20 to the radio terminal 10 is measured as follow. The application processing unit 26 of the communication terminal transmits the packet for measurement including the time stamp to the application processing unit 16 of the radio terminal 10.

As receiving the packet for measurement, the application processing unit 16 specifies the transmitting time from the time stamp included in the packet for measurement, and measures the difference of a receiving time of the packet for measurement and the specified transmitting time as the holding time of the second network 200 in the downlink. Alternately, if respective packet for measurement is transmitted at constant transmission time interval, the application processing unit 16 measures the jitter from difference of respective receiving time of the packet for measurement.

The application processing unit 16 repeat such process for multiple time, and measure a jitter expressing variation of the holding time by measuring the holding time for respective packet for measurement. Alternately, if respective packet for measurement is transmitted at constant transmission time interval, the application processing unit 26 measures the jitter from difference of respective receiving time of the packet for measurement.

The application processing unit 16 transmits information (Delay and Jitter Information Indication) indicating a measurement result of the uplink delay time (holding time and jitter) to the application processing unit 26 (step 25). Thus, the application processing unit 16 and the application processing unit 26 can grasp the downlink delay time, and may use the delay time for various determination or control in the above described embodiments.

(2) Measurement method 2

The measurement method 2 is a method for measuring the delay time at the MIH function unit 13 of the radio terminal 10 and MIH function unit 23 of the communication terminal 20.

Here, a measurement of the delay time of the second network 200 when the radio terminal 10 performs the handover from the first network 100 to the second network 200 will be described with reference to the FIG. 7 or FIG. 11. Specifically, the operation performed between step 24 and step 25 will be described.

In step 24, the MIH user 14 notifies a MIH_Link_Qos_Parameters_Measure.request for requesting the measurement of the delay time of the second network 200, to the MIH function unit 13, when the MIH_Handover_Prepare.confirm is notified from the MIH function unit 13. The MIH function unit 13 transmits the MIH_Link_Qos_Parameters_Measure.request to the MIH function unit 23 of the communication terminal 20

The MIH function unit 23 transmits a MIH_Link_Qos Parameters_Measure.confirm which is response for the MIH_Link_Qos Parameters_Measure.request, to the MIH function unit 13 of the radio terminal 10, as receiving the MIH_Link_Qos_Parameters_Measure.request.

The MIH function unit 13 transmits the packet for measurement(ICMP packet), as same as the measurement method 1, to the MIH function unit 23 of the communication terminal 20, as receiving the MIH_Link_Qos_Parameters_Measure.confirm. As receiving the packet for measurement, the MIH function unit 23 specifies the transmitting time from the time stamp included in the packet for measurement, and measures the difference of a receiving time of the packet for measurement and the specified transmitting time as the uplink holding time.

The MIH function unit 23 repeat such process for multiple time, and measure a jitter expressing variation of the holding time by measuring the holding time for respective packet for measurement. Alternately, if respective packet for measurement is transmitted at constant transmission time interval, the MIH function unit 23 measures the jitter from difference of respective receiving time of the packet for measurement.

The MIH function unit 23 transmits MIH_Link_Qos Parameters_Measure_Result.indication indicating a measurement result of the uplink delay time (holding time and jitter) to the MIH function unit 13 of the radio terminal 10, and notifies MIH_Link_Qos Parameters_Measure_Result.indication to the application processing unit 26. The MIH function unit 13 notifies the MIH_Link_Qos Parameters_Measure_Result.indication to the application processing unit 16.

On the contrary, the downlink delay time is measured as follow. The MIH function unit 23 transmits the packet for measurement including the time stamp to the MIH function unit 13 of the radio terminal 10. As receiving the packet for measurement, the MIH function unit 13 specifies the transmitting time from the time stamp included in the packet for measurement, and measures the difference of a receiving time of the packet for measurement and the specified transmitting time as the downlink holding time.

The MIH function unit 13 repeat such process for multiple time, and measure a jitter expressing variation of the holding time by measuring the holding time for respective packet for measurement. Alternately, if respective packet for measurement is transmitted at constant transmission time interval, the MIH function unit 13 measures the jitter from difference of respective receiving time of the packet for measurement.

The MIH function unit 13 transmits MIH_Link_Qos Parameters_Measure_Result.indication indicating a measurement result of the uplink delay time (holding time and jitter) to the MIH function unit 23 of the communication terminal 20, and notifies MIH_Link_Qos Parameters_Measure_Result.indication to the application processing unit 16.

Although the MIH function unit 13 of the radio terminal 10 and the MIH function unit 23 of the communication terminal 20 measure the delay time in the measurement method 2, if the MIH function unit is provided with the home agent 30, the MIH function unit 13 of the radio terminal 10 and the MIH function unit of the home agent 30 may measure the delay time. [0239]

The application processing unit 16 and the application processing unit 26 may have a delay time management table for managing the delay time for respective network. The application processing unit 16 and the application processing unit 26 update the delay time management table using the measurement result of the delay time. The application processing unit 16 and the application processing unit 26 estimate the delay time with reference to the delay time management table, if the delay time cannot be measured for some reason.

Note that the entire content of Japanese Patent Application No. 2008-219842 (filed on Aug. 28, 2008) and Japanese Patent Application No. 2009-017403 (filed on Jan. 28, 2009) are incorporated herein by reference.

INDUSTRIAL APPLICABILITY

As has been described, the radio terminal and the communication terminal according to the present invention enable appropriate control of the amount of packets stored in the buffer after handover from the first network to the second network, and thus the invention is useful in radio communication such as mobile communication.

The invention claimed is:

1. A radio terminal which communicates with a communication terminal through any of a first network and a second network having a longer delay time than the first network, the radio terminal comprising:
 a reception unit configured to receive packets at predetermined intervals through any of the first network and the second network;
 a buffer configured to temporarily store therein packets received in the reception unit;
 a transmission unit configured to transmit a preparation request for handover from the first network to the second network; and
 a reproduction unit comprising a processing unit that reproduces the packets stored in the buffer at a predetermined rate determined according to the predetermined intervals, wherein
 the reproduction unit increases the amount of packets stored in the buffer by changing a packet reproduction rate to a rate which is based on a delay time of the second network, in response to transmission of the preparation request for handover and prior to a transmission of an execution request for handover.

2. The radio terminal according to claim 1, wherein the reproduction unit performs adaptive buffer control of adjusting a reproduction rate of the packets so as to maintain the amount of packets stored in the buffer at an optimal packet amount, and the reproduction unit stops the adaptive buffer control in response to transmission of the preparation request for handover.

3. The radio terminal according to claim 2, wherein the reception unit receives a completion notification of handover from the first network to the second network, and the reproduction unit resumes the adaptive buffer control in a case where the amount of packets stored in the buffer reaches an optimal packet amount in the second network after receipt of the completion notification of handover.

4. The radio terminal according to claim 1, wherein the reception unit receives a completion notification of handover from the first network to the second network, and the reproduction unit changes the packet reproduction rate back to the predetermined rate, in a case where the amount of packets stored in the buffer reaches a predetermined packet amount before receipt of the completion notification for handover.

5. The radio terminal according to claim 1, wherein the reception unit receives a completion notification for handover from the first network to the second network, the reproduction unit changes the packet reproduction rate back to the predetermined rate, in a case where the amount of packets stored in the buffer reaches a predetermined packet amount before receipt of the completion notification for handover, and the reproduction unit changes the packet reproduction rate to a rate faster than the predetermined rate in response to receipt of the completion notification for handover.

6. The radio terminal according to claim 4, wherein the predetermined packet amount is calculated on the basis of the delay time of the first network and the delay time of the second network.

7. A communication terminal which communicates with a radio terminal using any of a first network and a second network having a longer delay time than the first network, the communication terminal comprising:
  a transmission unit configured to transmit packets at predetermined intervals to the radio terminal,
  a reception unit configured to receive a preparation request for handover from the first network to the second network, and an execution request for handover of the radio terminal from the first network to the second network after the receipt of the preparation request for handover, and
  an acquisition unit comprising a processing unit that acquires the delay time of the first network and the delay time of the second network in response to the receipt of the preparation request for handover, wherein
  the transmission unit transmits retransmission packets at intervals shorter than the predetermined intervals after the receipt of the execution request for handover, the retransmission packets being packets that the radio terminal unable to receive normally.

8. The communication terminal according to claim 7, wherein the transmission unit transmits the retransmission packets with a lower coding rate than the packets transmitted at the predetermined intervals.

9. A communication terminal which communicates with a radio terminal using any of a first network and a second network having a longer delay time than the first network, the communication terminal comprising:
  a reception unit configured to receive packets at predetermined intervals from the radio terminal;
  a buffer configured to temporarily store packets received in the reception unit; and
  a reproduction unit comprising a processing unit that reproduces the packets stored in the buffer at a predetermined rate determined according to the predetermined intervals, wherein
  the reception unit receives a preparation request for handover of the radio terminal from the first network to the second network, and
  the reproduction unit increases the amount of packets stored in the buffer by changing a packet reproduction rate to a rate which is based on a delay time of the second network, in response to receipt of the preparation request for handover and prior to a transmission of an execution request for handover.

10. The communication terminal according to claim 9, wherein the reproduction unit performs adaptive buffer control of adjusting a reproduction rate of the packets so as to maintain the amount of packets stored in the buffer at an optimal packet amount, and the reproduction unit stops the adaptive buffer control upon receipt of the preparation request for handover.

11. The communication terminal according to claim 9, wherein the reception unit receives an execution request for handover of the radio terminal from the first network to the second network, and the reproduction unit resumes the adaptive buffer control in a case where the amount of packets stored in the buffer reaches an optimal packet amount in the second network after receipt of the execution request for handover.

12. The communication terminal according to claim 9, wherein the reproduction unit changes the packet reproduction rate back to the predetermined rate, in a case where the amount of packets stored in the buffer reaches a predetermined packet amount before receipt of the first packet of packets to be received through the second network.

13. The communication terminal according to claim 9, wherein the reproduction unit changes the packet reproduction rate back to the predetermined rate, in a case where the amount of packets stored in the buffer reaches a predetermined packet amount before receipt of the first packet of packets to be received through the second network, and the reproduction unit changes the packet reproduction rate to a rate faster than the predetermined rate in response to receipt of the first packet.

14. The radio terminal according to claim 12, wherein the predetermined packet amount is calculated on the basis of the delay time of the first network and the delay time of the second network.

15. A radio terminal which communicates with a communication terminal using any of a first network and a second network having a longer delay time than the first network, the radio terminal comprising:
  a transmission unit configured to transmit packets at predetermined intervals to the radio terminal via any of the first network and the second network, transmit a preparation request for handover from the first network to the second network, and an execution request for handover of the radio terminal from the first network to the second network after the transmission of the preparation request for handover, and
  an acquisition unit comprising a processing unit that acquires the delay time of the first network and the delay time of the second network in response to the transmission of the preparation request for handover, wherein
  the transmission unit transmits retransmission packets at intervals shorter than the predetermined intervals after the receipt of the execution request for handover, the retransmission packets being packets that the communication terminal unable to receive normally.

16. The radio terminal according to claim 15, wherein the transmission unit transmits the retransmission packets with a lower coding rate than the packets transmitted at the predetermined intervals.

* * * * *